(12) United States Patent
Roell et al.

(10) Patent No.: US 9,856,632 B2
(45) Date of Patent: Jan. 2, 2018

(54) VALVE ACCESS CONDUIT ASSEMBLY AND METHOD OF INSTALLING THE ASSEMBLY

(71) Applicant: Argonics, Inc., Gwinn, MI (US)

(72) Inventors: Joseph Roell, Gwinn, MI (US); Alan J. Henderson, Marquette, MI (US)

(73) Assignee: Argonics, Inc., Gwinn, MI (US)

( * ) Notice: Subject to any disclaimer, the term of this patent is extended or adjusted under 35 U.S.C. 154(b) by 0 days.

(21) Appl. No.: 15/066,553

(22) Filed: Mar. 10, 2016

(65) Prior Publication Data

US 2016/0258140 A1 Sep. 8, 2016

Related U.S. Application Data

(63) Continuation-in-part of application No. 13/999,278, filed on Feb. 5, 2014.
(60) Provisional application No. 62/130,674, filed on Mar. 10, 2015.

(51) Int. Cl.
| | |
|---|---|
| F16L 5/00 | (2006.01) |
| E03B 7/07 | (2006.01) |
| E03B 9/08 | (2006.01) |
| F16K 31/46 | (2006.01) |

(52) U.S. Cl.
CPC .......... E03B 7/07 (2013.01); E03B 9/08 (2013.01); F16K 31/46 (2013.01); *Y10T 29/49407* (2015.01); *Y10T 137/0491* (2015.04); *Y10T 137/598* (2015.04); *Y10T 137/6991* (2015.04)

(58) Field of Classification Search
CPC ... B65D 21/086; Y10T 137/7017; E03B 9/10; E03B 7/07; E02D 29/1409; F16L 27/12

USPC .................. 137/363, 364, 369, 370
See application file for complete search history.

(56) References Cited

U.S. PATENT DOCUMENTS

| | | | | |
|---|---|---|---|---|
| 604,622 | A * | 5/1898 | Lobdell et al. | E03B 7/04 137/365 |
| 891,207 | A * | 6/1908 | Connolly | F16K 31/46 137/369 |
| 2,099,479 | A * | 11/1937 | Heinkel | E03B 9/10 137/367 |
| 2,176,399 | A * | 10/1939 | Garrett | F16K 41/02 137/368 |
| 4,036,249 | A * | 7/1977 | Perry, Sr. | E03F 1/002 137/367 |
| 4,819,687 | A * | 4/1989 | Alberico | F16K 27/006 137/367 |
| 6,142,698 | A * | 11/2000 | Nutter | F16B 7/0426 403/104 |

(Continued)

*Primary Examiner* — Reinaldo Sanchez-Medina
(74) *Attorney, Agent, or Firm* — Wood, Phillips, Katz, Clark & Mortimer

(57) ABSTRACT

The combination of: an underground valve for a supply line and having an underground actuator through which a state of the valve can be changed to control flow within the supply line; and a conduit assembly embedded in ground material and defining an access passage through which above ground access can be obtained to the valve actuator. The conduit assembly has an adaptor assembly with a body made from a non-metal material and having at least a first connector. The valve has at least a second connector. The first and second connectors cooperate to maintain the body operatively connected to the valve. A first conduit part is configured to connect to the body and bound a portion of the access passage accessible through an entry opening remote from the valve.

19 Claims, 24 Drawing Sheets

(56) References Cited

U.S. PATENT DOCUMENTS

| | | | | |
|---|---|---|---|---|
| 6,354,325 B1 * | 3/2002 | Warnes | ............... | E03B 9/10 137/367 |
| 7,117,883 B1 * | 10/2006 | Vitalo | ............... | E03B 9/08 137/366 |
| 7,469,876 B2 * | 12/2008 | Fox | ............... | F16K 35/06 251/292 |
| 8,082,945 B1 * | 12/2011 | White | ............... | F16K 27/006 137/369 |
| 2003/0230343 A1 * | 12/2003 | Phipps | ............... | E03B 9/08 137/364 |

* cited by examiner

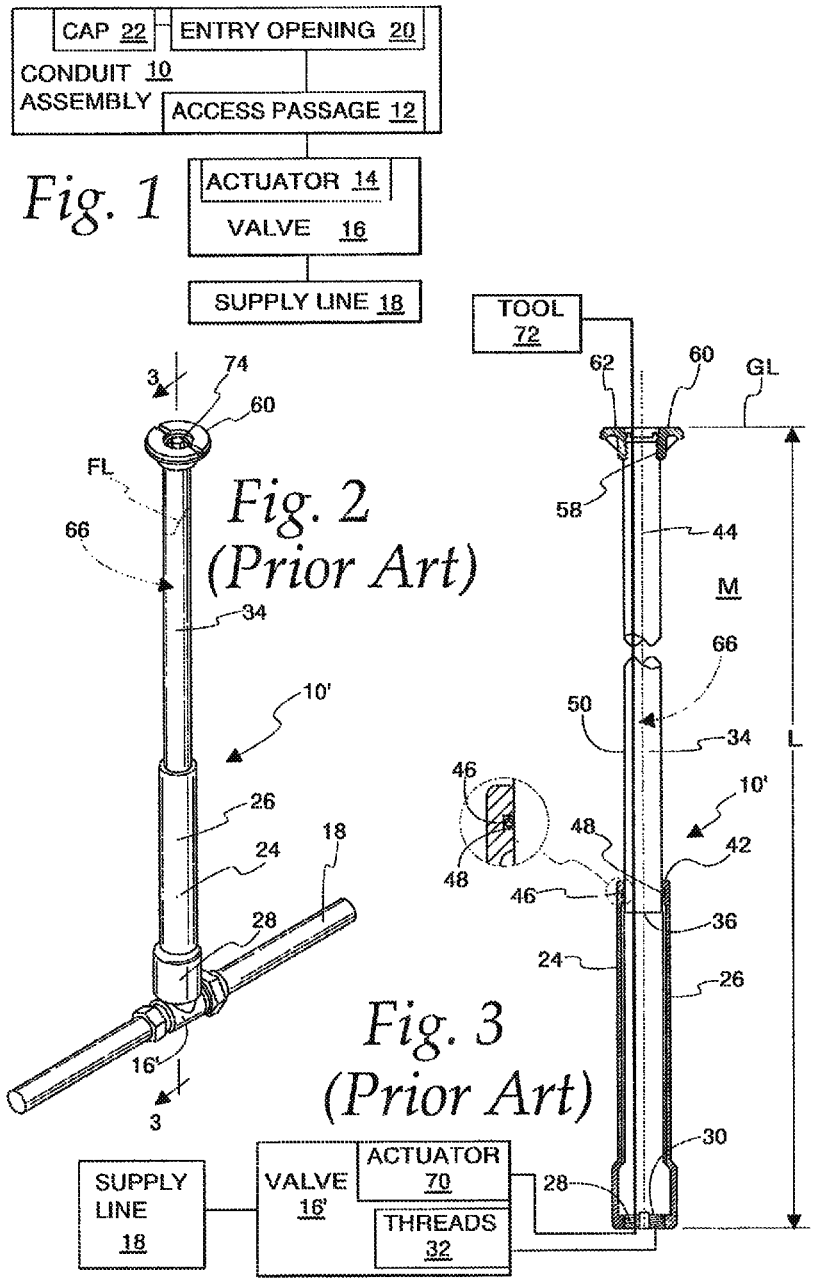

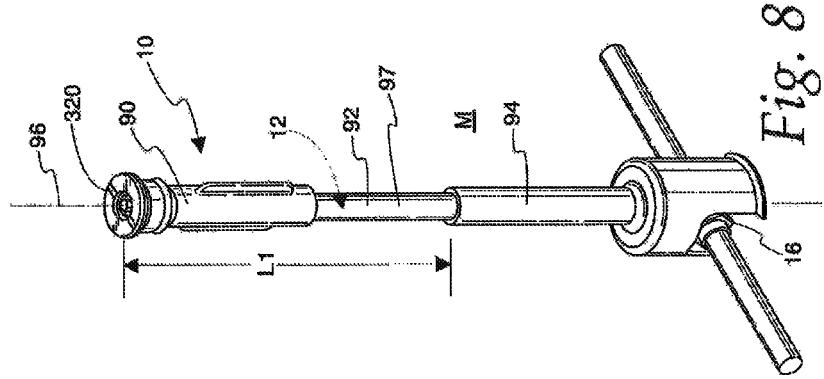
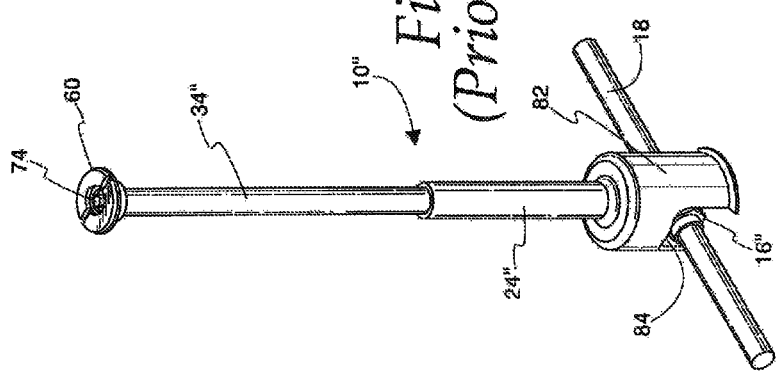

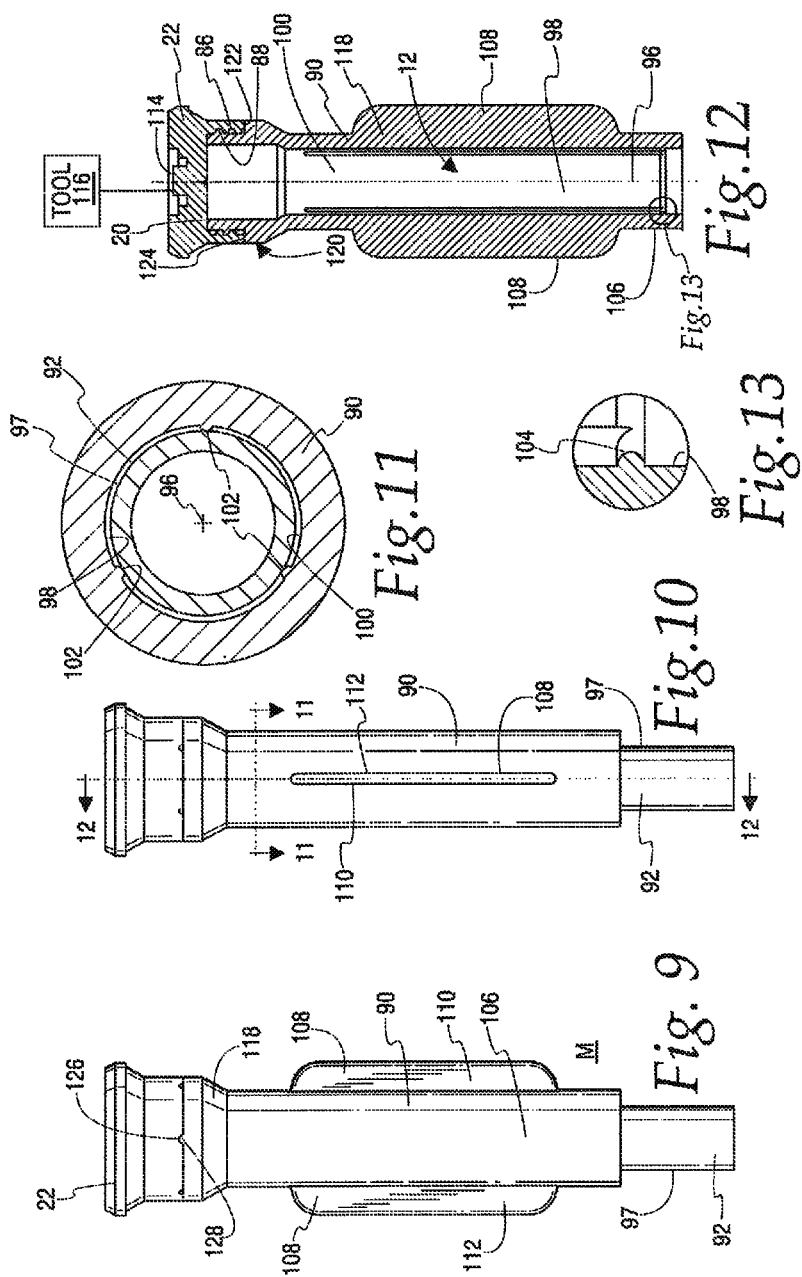

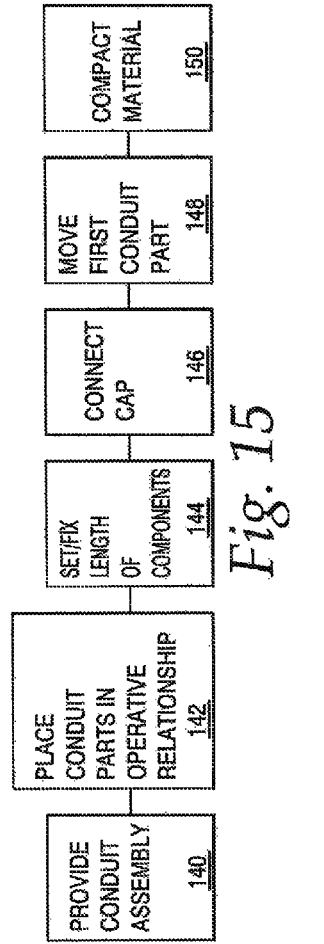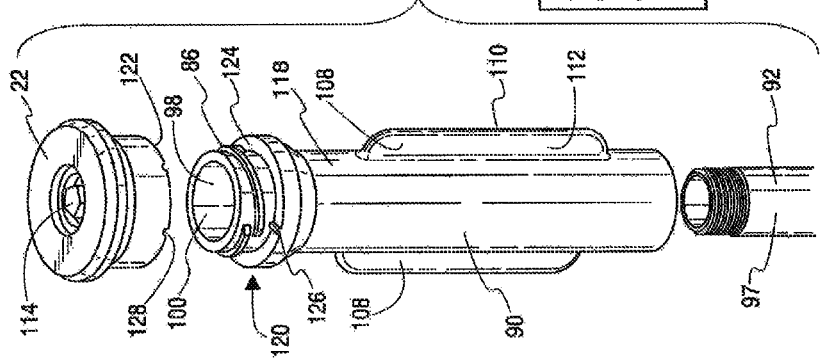

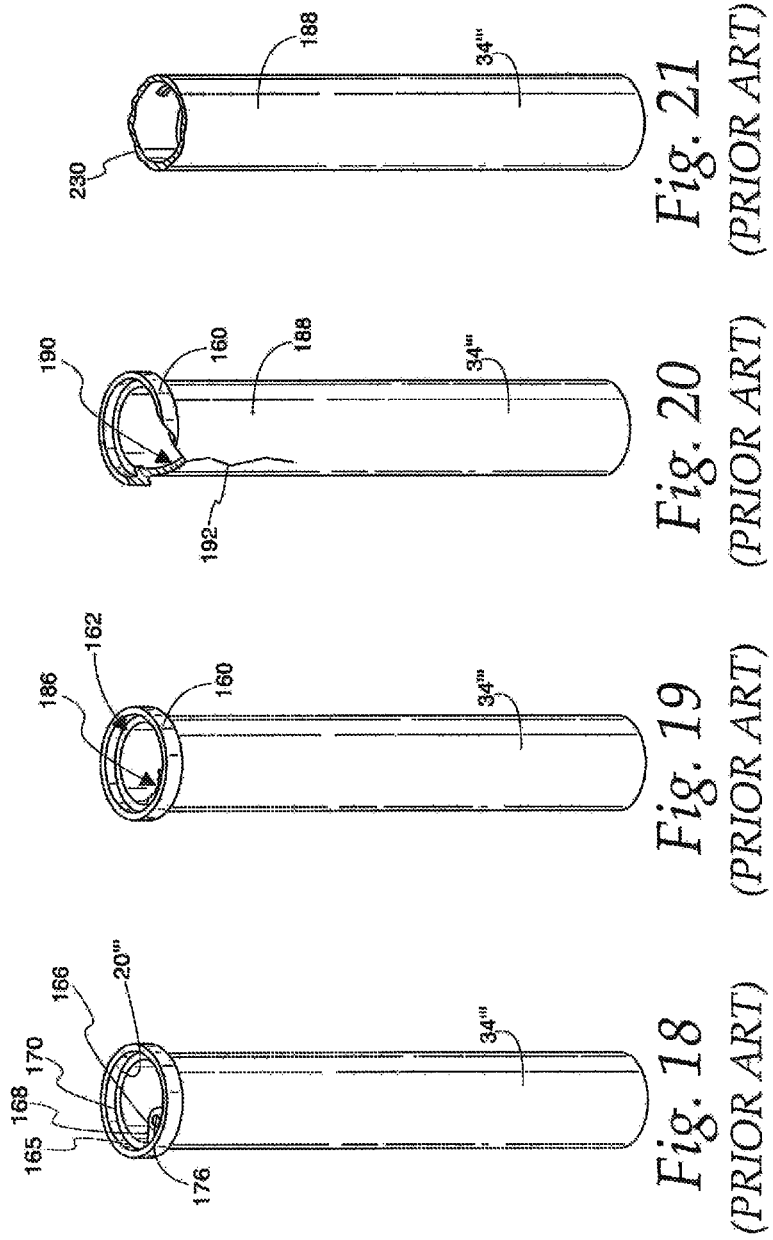

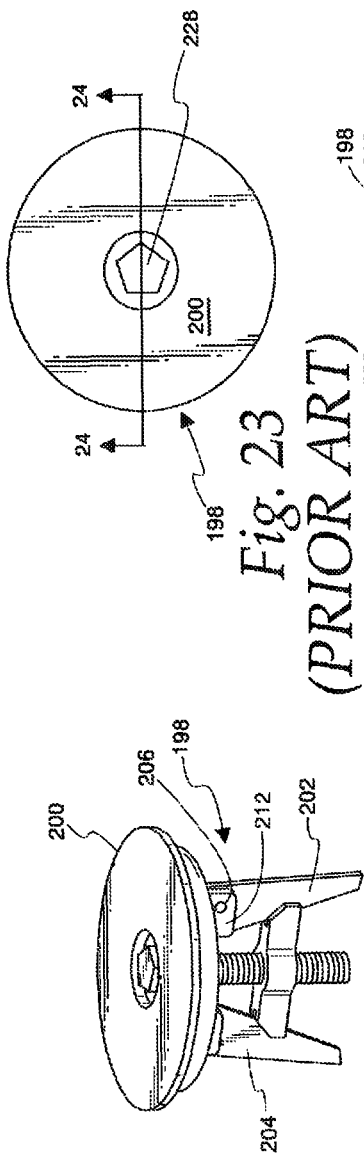
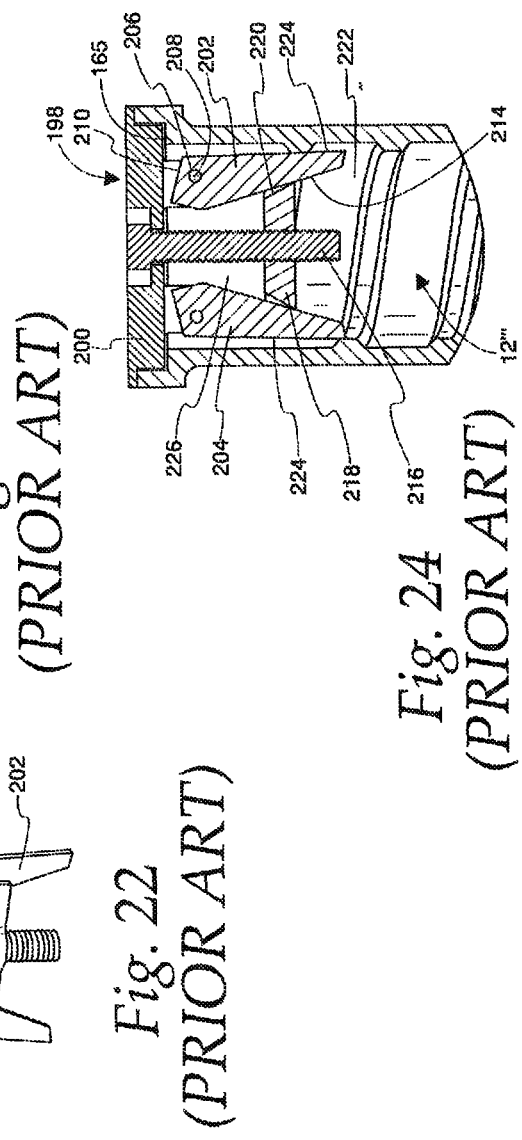
Fig. 22 (PRIOR ART)
Fig. 23 (PRIOR ART)
Fig. 24 (PRIOR ART)

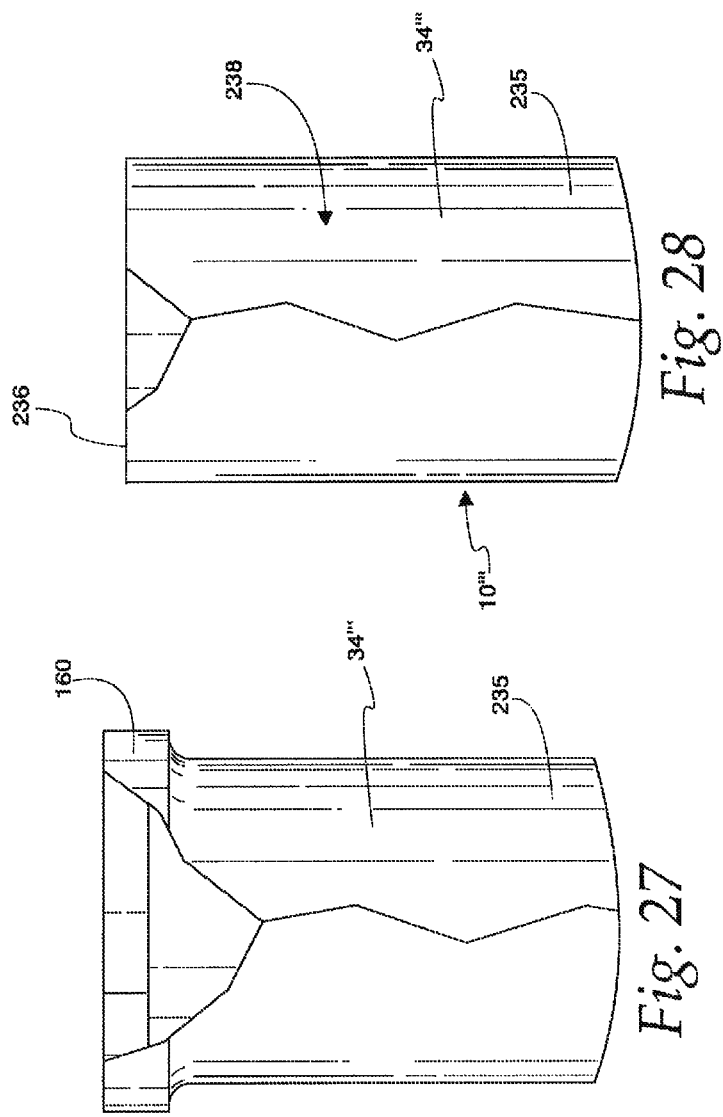

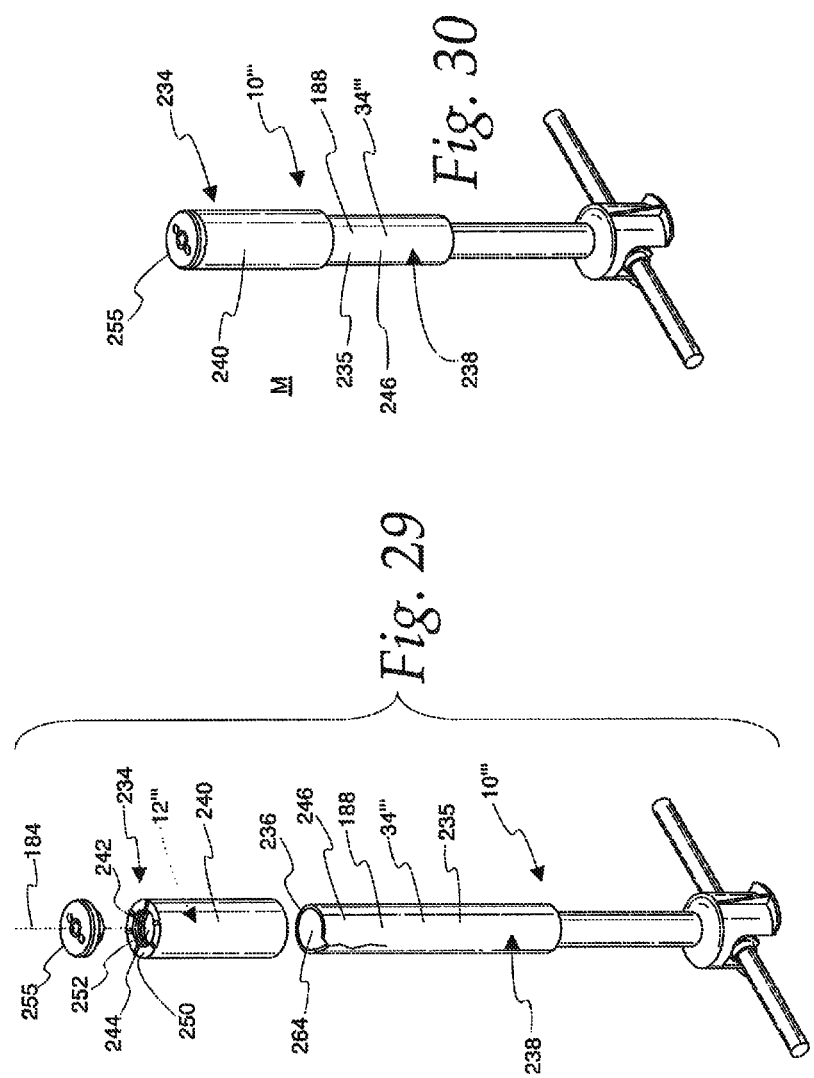

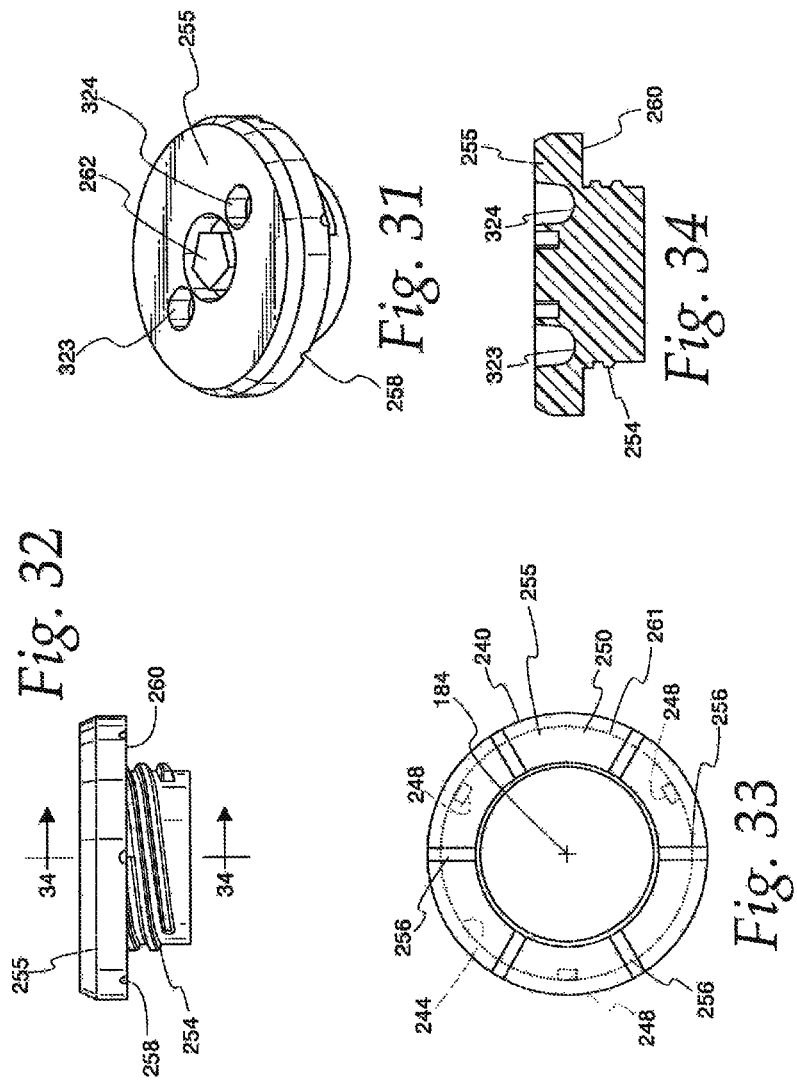

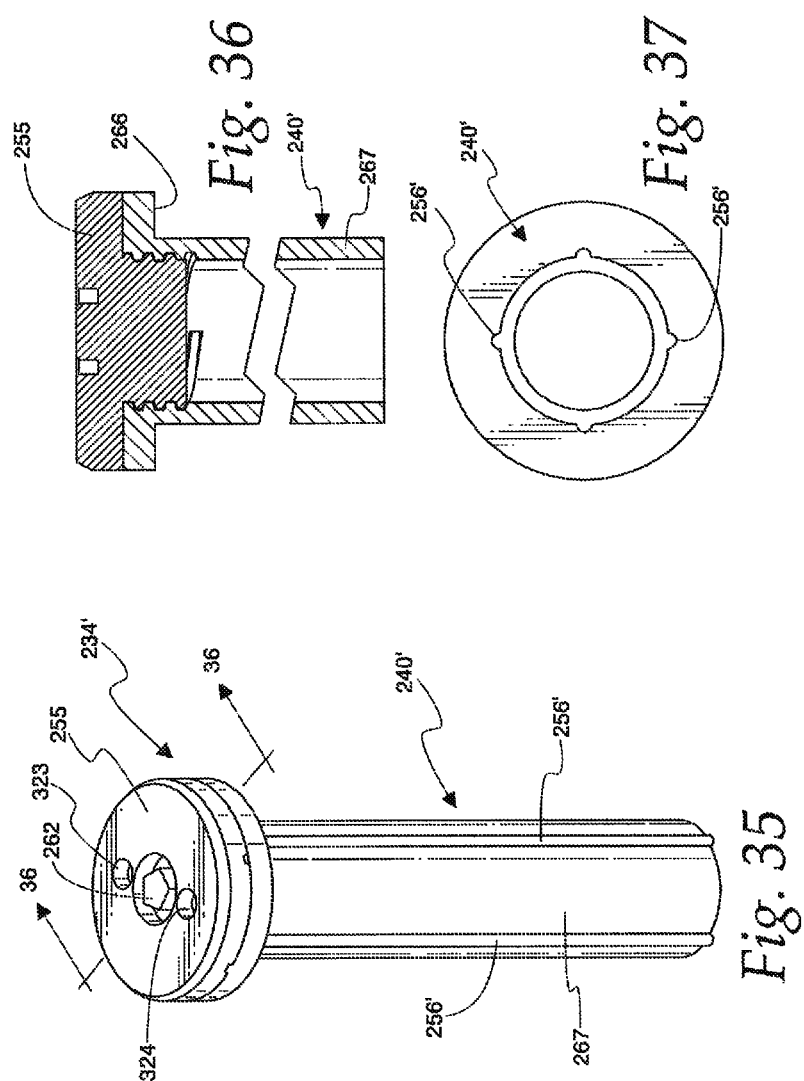

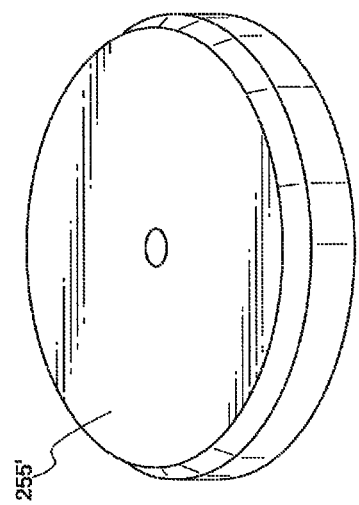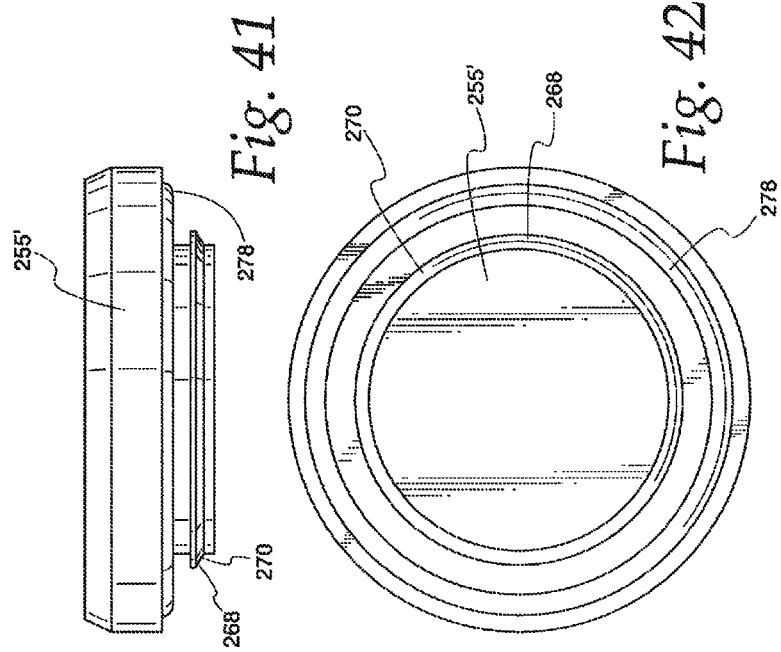

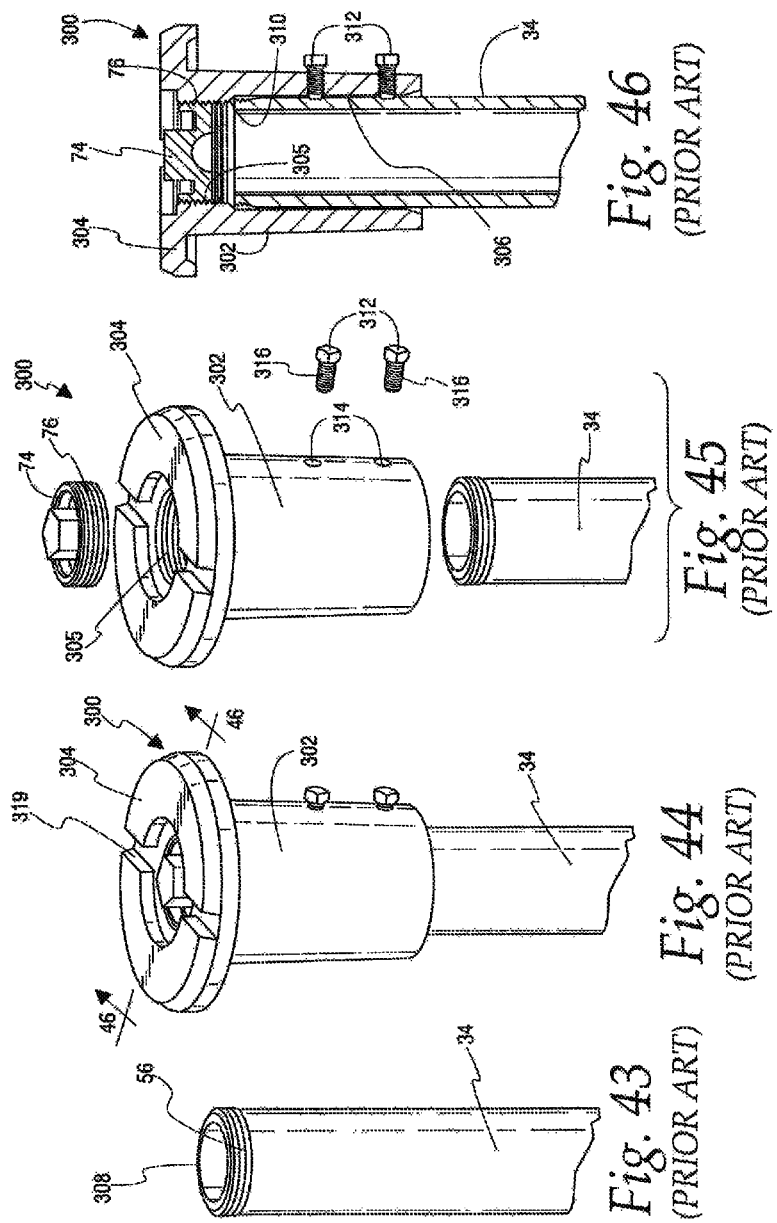

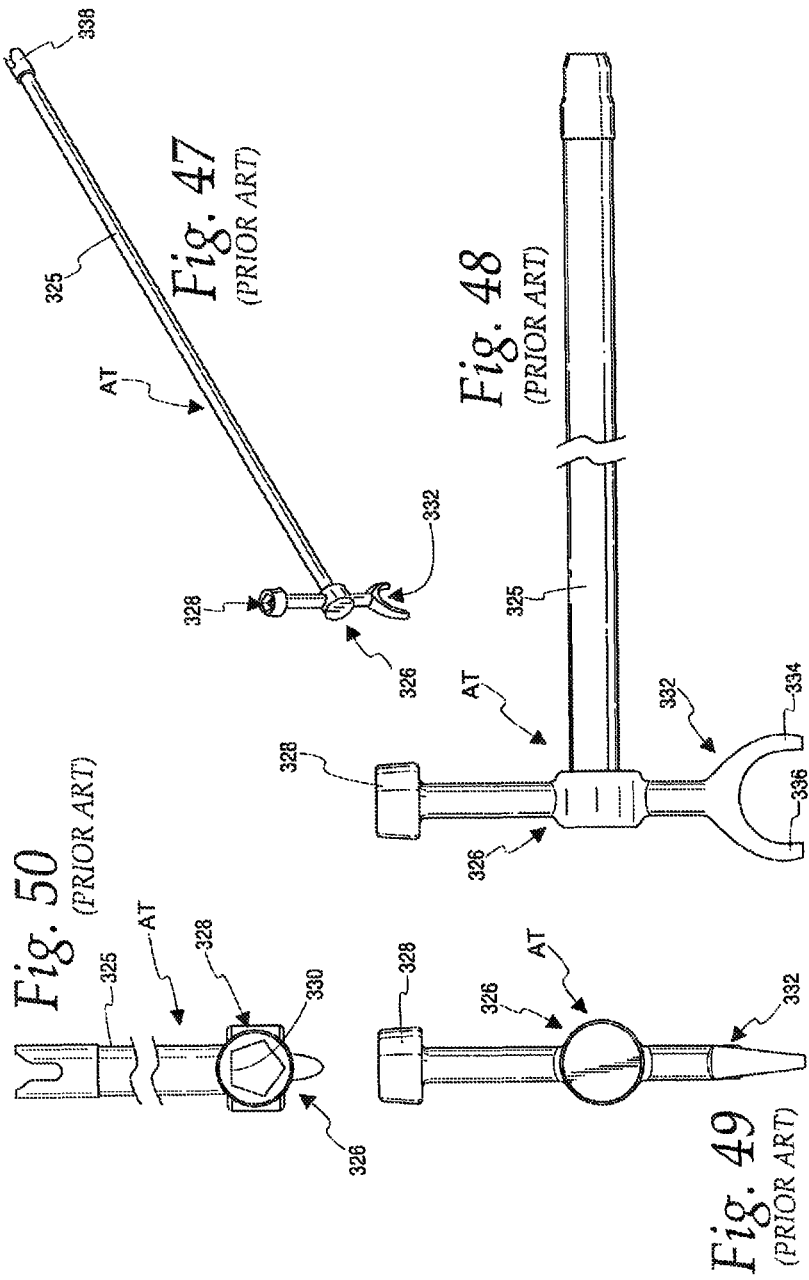

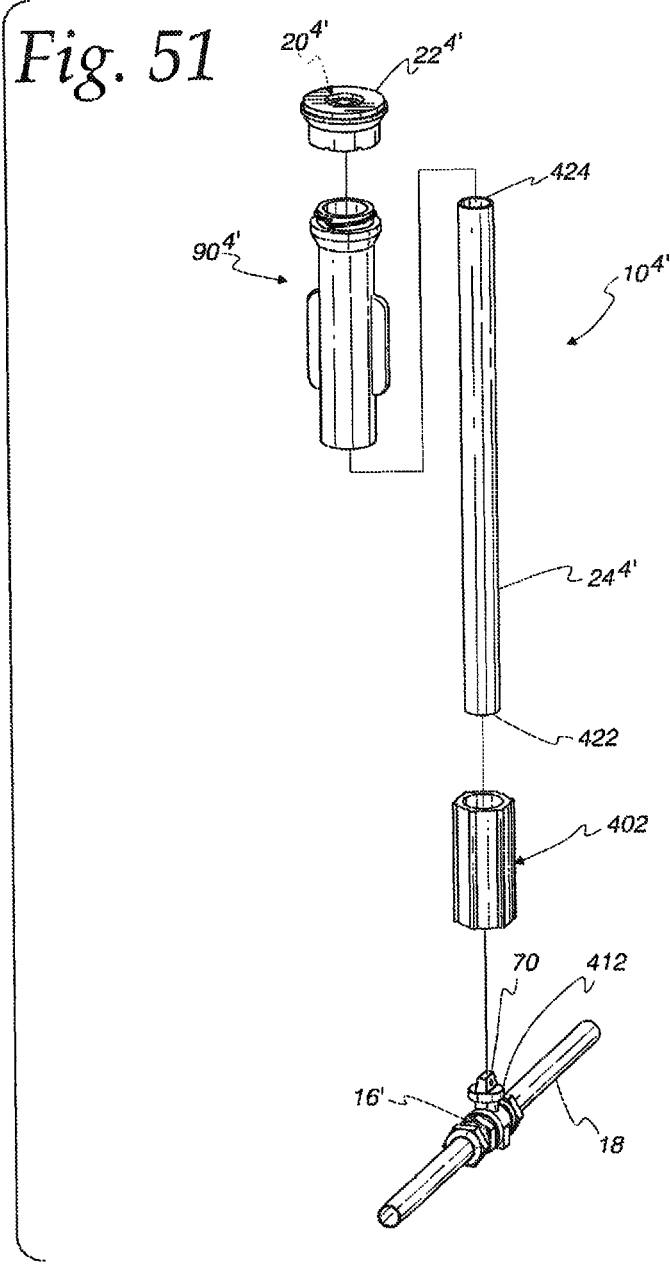

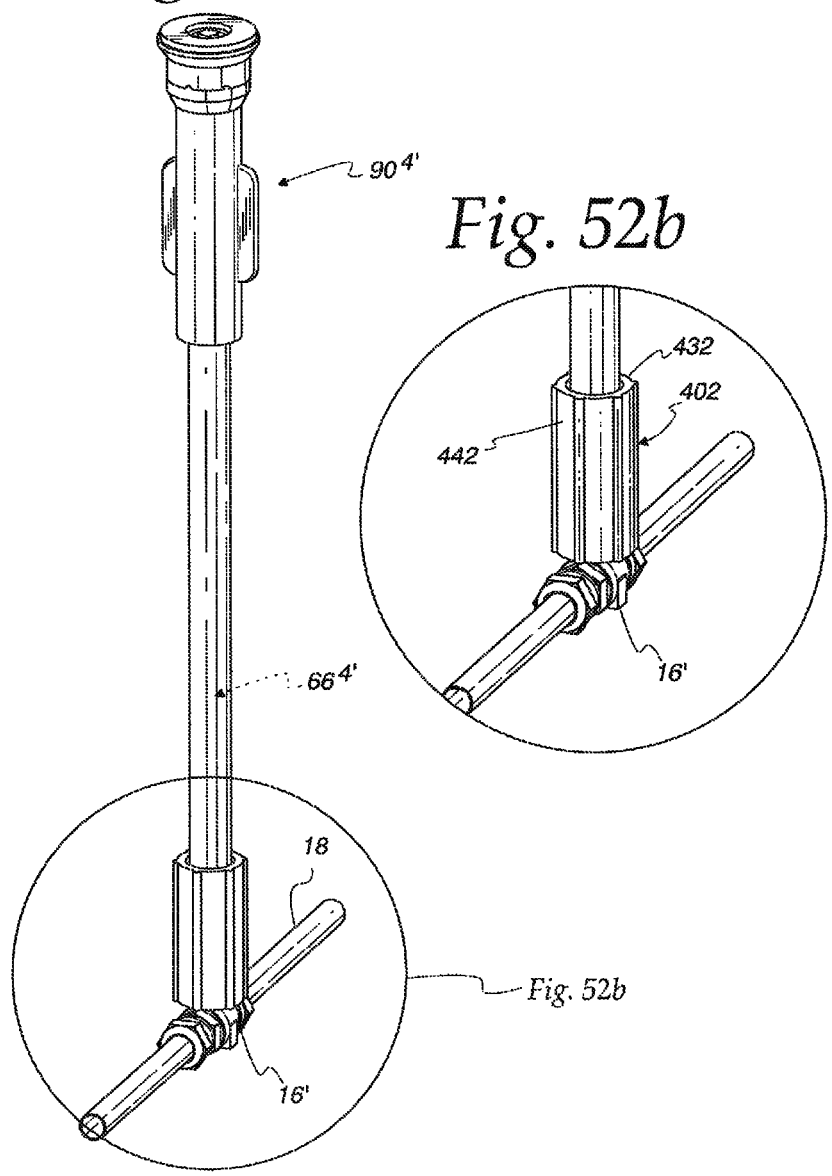

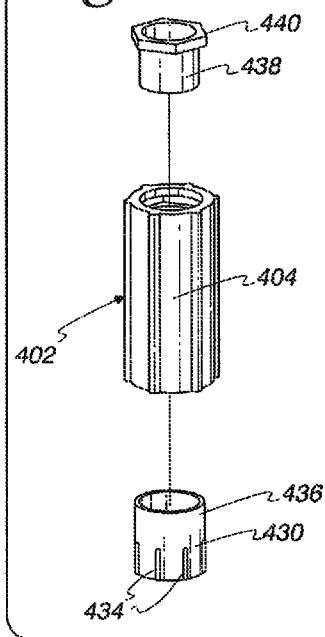
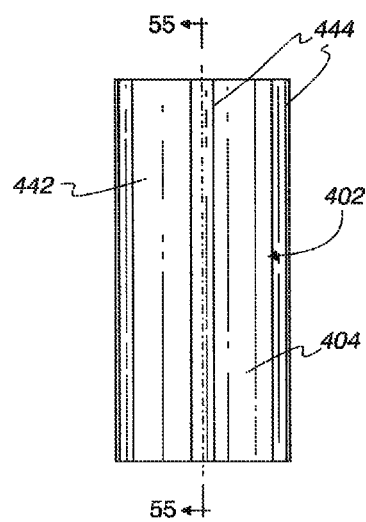
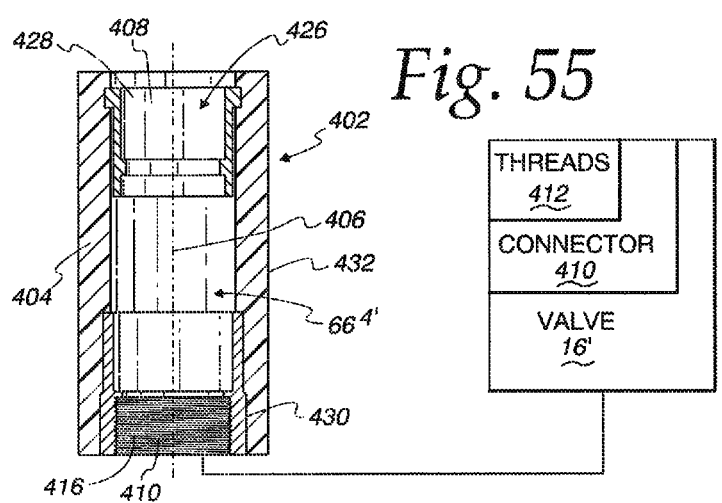

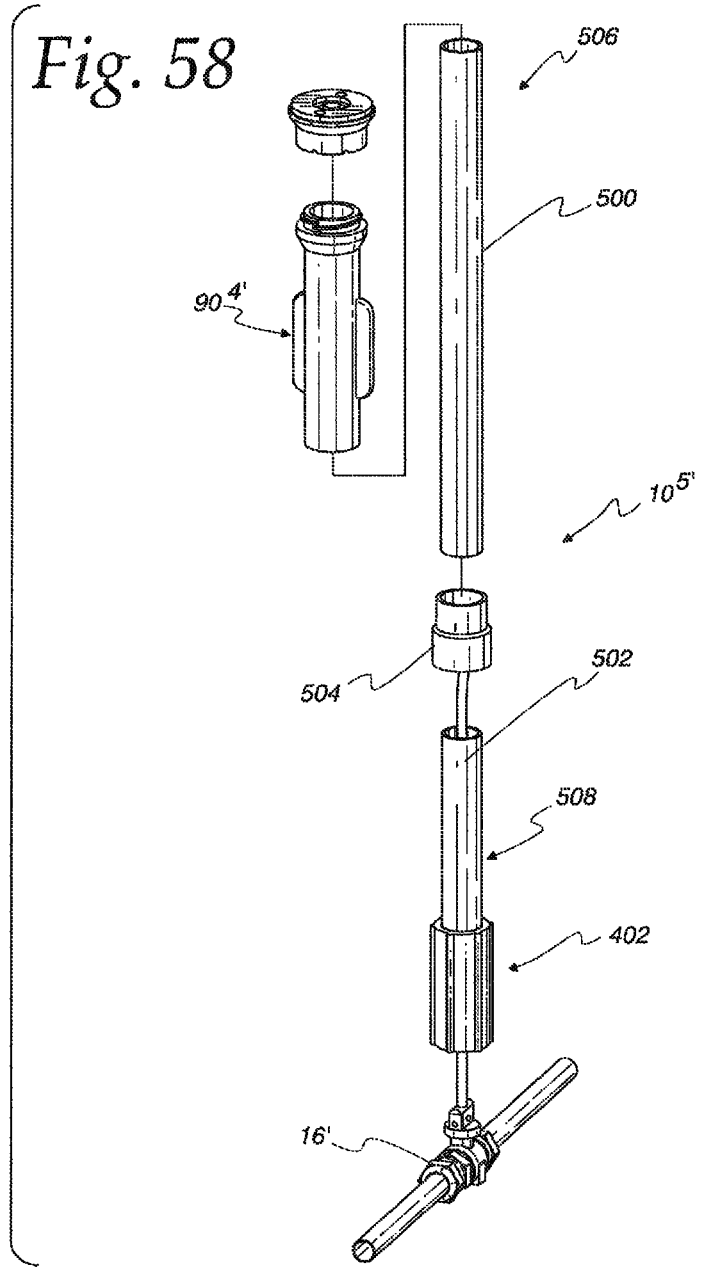

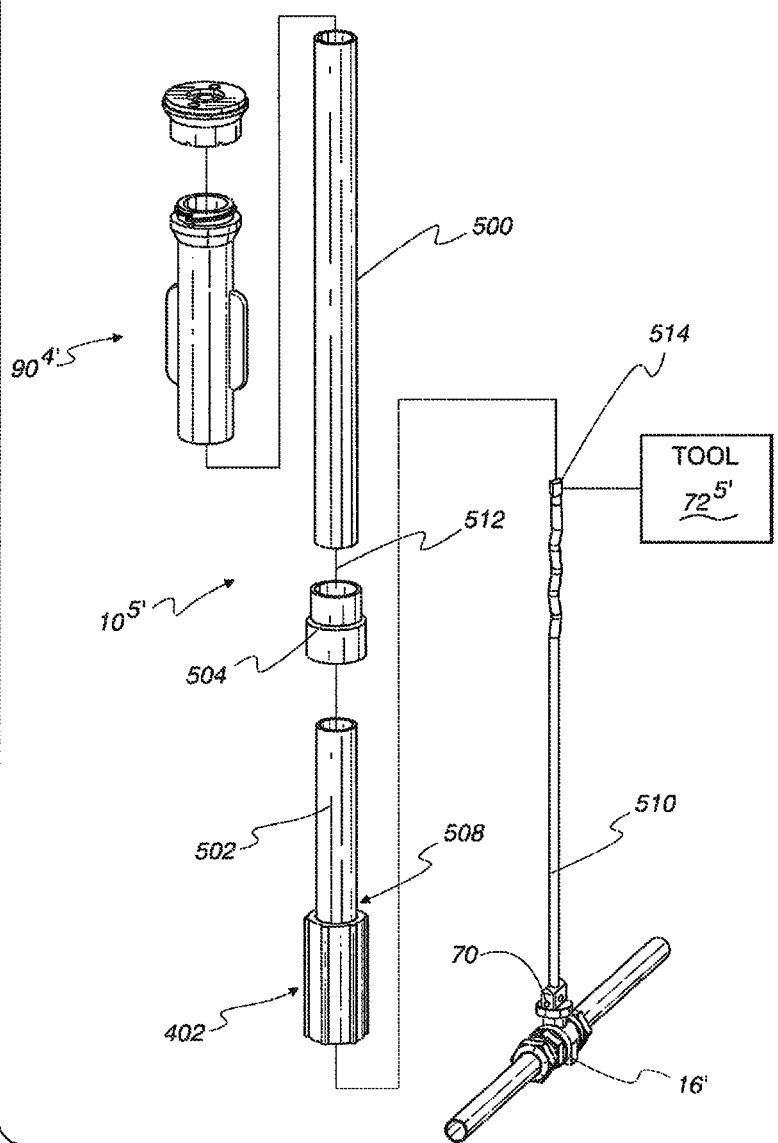

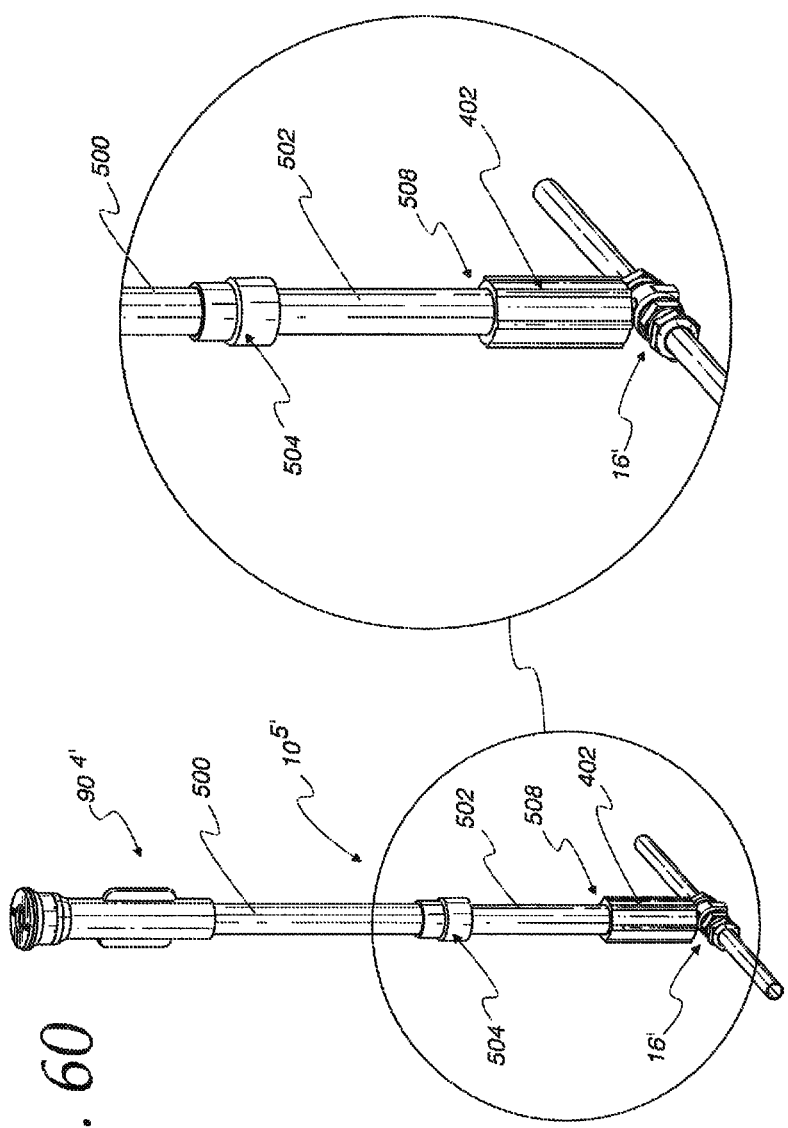

VALVE ACCESS CONDUIT ASSEMBLY AND METHOD OF INSTALLING THE ASSEMBLY

BACKGROUND OF THE INVENTION

Field of the Invention

This invention relates to underground valves, such as utility valves and, more particularly, to a conduit assembly through which above ground access can be gained to a valve.

Background Art

Underground valves are used to selectively control utility supply, such as water, to individual residences and businesses. Each valve is typically situated several feet underground and is accessed through a vertical conduit assembly. In one known form, the upper end of the conduit assembly is closed by a cap with a separable plug that is threaded into place. The plug is separated to produce an entry opening to a passage extending downwardly to the valve. The plug is provided with a fitting to be engaged by a special tool, which thereby allows a level of control of access to the valve.

Existing conduit assemblies take a number of different forms. In one form, a cast housing, with an inverted cup shape, is placed over the valve and straddles the supply line and valve. The housing continues upwardly into a conduit, with a length selected so that the cap on the conduit is flush with grade.

In an alternative design, a conduit assembly has a fitting that is threaded directly to the underground valve. The conduit assembly defines a passage that extends continuously from the valve to an upper access opening.

With both of the above designs, elongate tools are directed from above ground through the conduit assembly passages to engage actuators on the valves. The tools control turning of the actuators in opposite directions to selectively open and close the valves.

Existing designs have some inherent problems, some of which are aggravated as the parts thereof corrode and/or are otherwise affected by environmental conditions.

One problem is a result of the manner in which the upper cap and plug, that is a part thereof, are constructed. Typically, the plug is made from brass so that it is not prone to rusting. The threads on the brass plug mate with threads on another part of the cap, typically made from a dissimilar metal. That other metal is generally prone to rusting or corroding, which could cause the threads to bind, thereby inhibiting turning of the plug for separation. It may become necessary to exert a substantial torque upon the plug to effect separation thereof. This torque may cause another part of the conduit assembly to turn. Depending upon the particular construction, this turning may inflict damage upon the conduit assembly, the housing at the bottom thereof, the valve, and/or the supply line.

When this condition exists, the individual seeking to operate the valve has the option of either taking exceptional steps to avoid turning of any other part of the conduit assembly associated with the plug, or gambling that the plug will break free before the failure of any other part of the system under a large turning torque.

The former option represents a significant inconvenience, particularly when utilities budget very little time for their workers to effect access. The latter can have significant consequences, and in a worst case may necessitate a time-consuming repair that could involve replacement of one or more system parts. In an extreme case, the valve itself may have to be accessed, which involves digging around the conduit assembly to create an access opening wide enough to allow a worker to repair, or remove and replace, the damaged structure, potentially including the valve.

In the event the valve itself must be replaced, the utility may have to utilize an upstream shutoff that could inconvenience not only the immediately affected entity, but any entity supplied through an interconnected conduit network downstream of the shutoff.

The above problems may be aggravated by temperature and other weather conditions. For example, rain followed by freezing temperatures may further lock the system components and make separation of the access plug even more difficult.

Another problem that has been persistent is damage inflicted by ground expansion due to frost. The frost causes the material in which the conduit assembly is embedded to expand and produce an increasing wedging action between the cap and underground structure, including lower portions of the conduit assembly and the supply line. This may eventually lead to the failure of one or more parts, thereby requiring access to the underground region in the vicinity of the compromised structure so that necessary repairs can be effected.

Of particular concern with all existing systems is to avoid damage to the underground valves and associated supply lines. As noted above, repair and replacement of a valve and/or portions of the connected supply lines may require service interruption and/or expensive and time consuming repairs that are effected by excavating around the valve to allow direct access thereto. Valve/supply line damage may be inflicted by above ground turning forces imparted by workers, above ground impacts, in-ground movement of the conduit assembly components in response to ground shifting/settling, shifting of the conduit assembly components in response to expansion forces caused by frost, etc.

Ideally, these conduit assemblies would have the ability to absorb forces generated by the above actions and conditions in a manner that the valve and associated supply lines are not damaged and remain fully operational.

In spite of these inherent deficiencies with existing systems, the industry has continued to use conventional designs. The industry continues to seek out alternative designs that are economically feasible, while being reliable in terms of their operation, regardless of environmental conditions.

SUMMARY OF THE INVENTION

In one form, the invention is directed to the combination of: an underground valve for a supply line and having an underground actuator through which a state of the valve can be changed to control flow within the supply line; and a conduit assembly embedded in ground material and defining an access passage through which above ground access can be obtained to the valve actuator. The conduit assembly has an adaptor assembly. The adaptor assembly has a body made from a non-metal material and having at least a first connector. The valve has at least a second associated connector. The first and second connectors are configured to cooperate to maintain the body operatively connected to the valve. The conduit assembly further has at least a first conduit part configured to connect to the body and bound a portion of the access passage accessible through an entry opening remote from the valve.

In one form, the first and second connectors have cooperating threads.

In one form, the non-metal material making up the body is urethane.

In one form, the adaptor assembly has a main body part and a component that is connected to the main body part and defines the threads making up the first connector.

In one form, the main body part is mold formed around the component.

In one form, the adaptor assembly and a first end of the first conduit part are configured so that the first end of the first conduit part and adaptor assembly are telescopingly engaged.

In one form, the adaptor assembly has a main body part and a component that is connected to the main body part and configured to telescopingly engage the first end of the first conduit part.

In one form, the body has a cylindrical shape with a central axis. A cylindrical outer surface, from which at least one component projects radially relative to the central axis, is configured to at least one of: a) facilitate hand gripping of the body; and b) resist turning of the body around the central axis with ground material compacted around the body.

In one form, the at least one component has a plurality of circumferentially spaced, axially extending ribs.

In one form, the first conduit part is made from a non-metal material.

In one form, the conduit assembly further includes a second conduit part. The first conduit part has a first end connected to the body and a second end. The second conduit part has first and second ends. The first end of the second conduit part and second end of the first conduit part are configured to be telescopingly engaged to thereby allow changing of a combined length of the first and second conduit parts.

In one form, the second conduit part extends to an entry opening to the access passage and is made from a non-metal material.

In one form, the conduit assembly further includes a cap that can be selectively changed between: a) a first state wherein the cap blocks the entry opening; and b) a second state wherein above ground access can be gained to the valve actuator through the entry opening and access passage.

In one form, substantially the entire conduit assembly extending away from the body toward the entry opening is made from a non-metal material.

In one form, the component is made from a non-metal material.

In one form, the first end of the first conduit part is secured to the adaptor assembly with an adhesive.

In one form, the invention is directed to a method of installing a conduit assembly to facilitate controlled access to an actuator on an underground valve. The method includes the steps of: providing the combination described above; securing the body to the valve; sliding an end of the first conduit part relative to the adaptor assembly and into a first relationship with the adaptor assembly; securing the end of the first conduit part relative to the adaptor assembly with the end of the first conduit part and adaptor assembly in the first relationship; cutting the first conduit part at a second location so that the first conduit part has a selected length between the end of the first conduit part and a second location; telescopingly engaging the second conduit part with the first conduit part so that the first and second conduit parts have a desired combined length; and compacting material around the conduit assembly.

In one form, the step of securing the body to the valve involves securing the body to the valve through a threaded connection by turning the body around an axis relative to the valve.

In one form, the step of cutting the first conduit part involves cutting the first conduit part at a site at which the underground valve is located.

BRIEF DESCRIPTION OF THE DRAWINGS

FIG. 1 is a schematic representation of a conduit assembly, according to the present invention, in an operative state in relationship to a valve associated with a supply line;

FIG. 2 is a perspective view of a prior art conduit assembly in an operative state relative to a valve on a supply line;

FIG. 3 is an enlarged, partial, cross-sectional view of the conduit assembly taken along line 3-3 of FIG. 2;

FIG. 6 is a view as in FIG. 2 of a modified form of prior art conduit assembly in an operative state relative to a valve on a supply line;

FIG. 7 is a schematic representation of cooperating parts on a cap and another part of an inventive form of the conduit assembly;

FIG. 8 is a view as in FIG. 6 showing a specific form of the inventive conduit assembly, according to the invention;

FIG. 9 is an enlarged, side elevation view of a first conduit part on the inventive conduit assembly and showing a portion of a cooperating second conduit part;

FIG. 10 is a view as in FIG. 9 wherein the first conduit part is turned through 90°;

FIG. 11 is an enlarged, cross-sectional view of the conduit parts taken along line 11-11 of FIG. 10;

FIG. 12 is a cross-sectional view of the first conduit part taken along line 12-12 of FIG. 10;

FIG. 13 is an enlarged view of a portion of the conduit part within the circle in FIG. 12;

FIG. 14 is an exploded, perspective view of the components in FIGS. 9-13;

FIG. 15 is a flow diagram representation of a method of installing a conduit assembly, according to the invention, to facilitate controlled access to an actuator on an underground valve;

FIG. 18 is an enlarged, perspective view of an upper conduit part on the conduit assembly in FIGS. 16 and 17;

FIGS. 19-21 show the conduit part of FIG. 18 with different defects for which repair is required;

FIG. 22 is an enlarged, perspective view of a conventional replacement cap used on the conduit part in FIG. 18 once damage is inflicted;

FIG. 23 is a plan view of the replacement cap in FIG. 22;

FIG. 24 is a cross-sectional view of the replacement cap in FIGS. 22 and 23 operatively connected to the upper region of the conduit part in FIG. 18;

FIG. 27 is an enlarged, elevation view of the conduit part having the condition in FIG. 20;

FIG. 28 is a view as in FIG. 27 wherein part of the damaged portion of the conduit part is removed preparatory to repair;

FIG. 29 is an exploded perspective view corresponding to that in FIG. 17 wherein a repair assembly is used after the conduit part is prepared as in FIG. 28;

FIG. 30 is a view as in FIG. 29 with the parts assembled;

FIG. 31 is an enlarged, perspective view of the cap used on the repair assembly in FIGS. 29 and 30;

FIG. 32 is a side elevation view of the cap in FIG. 31;

FIG. 33 is a bottom view of the cap in FIGS. 31 and 32;

FIG. 34 is a cross-sectional view of the cap taken along line 34-34 of FIG. 32;

FIG. 35 is a perspective view of a modified form of repair assembly, according to the invention;

FIG. 36 is an enlarged, cross-sectional view of the repair assembly taken along lines 36-36 of FIG. 35;

FIG. 37 is a bottom view of a cap on the repair assembly in FIGS. 35 and 36;

FIG. 40 is an enlarged, perspective view of a cap that is part of the repair assembly in FIGS. 38 and 39;

FIG. 41 is a side elevation view of the cap in FIG. 40;

FIG. 42 is a bottom view of the cap in FIGS. 40 and 41;

FIG. 43 is an enlarged, fragmentary, perspective view of a conventional upper conduit part, as shown in FIG. 2, that is broken off at an upper threaded portion;

FIG. 44 is a view as in FIG. 43 wherein a conventional repair cap assembly has been placed over the fractured conduit part;

FIG. 45 is an exploded perspective view of the components shown in FIG. 44;

FIG. 46 is a cross-sectional view of the conduit part with the repair cap assembly taken along line 46-46 of FIG. 44;

FIG. 47 is a perspective view of a conventional tool that is used to turn access caps and cooperate with actuators underground to operate valves;

FIG. 48 is an enlarged, side elevation view of the actuating tool in FIG. 47;

FIG. 49 is an enlarged, end elevation view of the actuating tool in FIG. 47;

FIG. 50 is an enlarged, top view of the actuating tool in FIG. 47;

FIG. 51 is an exploded perspective view of a further modified form of conduit assembly, according to the present invention;

FIG. 52a is a view as in FIG. 51 with the components in an assembled state;

FIG. 52b is an enlarged view of the structure within the circle in FIG. 52a;

FIG. 53 is an enlarged, exploded, perspective view of an adaptor assembly on the conduit assembly in FIGS. 51 and 52;

FIG. 54 is an enlarged, elevation view of the adaptor assembly in FIG. 53;

FIG. 55 is a cross-sectional view of the adaptor assembly taken along line 55-55 of FIG. 54;

FIG. 58 is an exploded, perspective view of a still further modified form of conduit assembly, according to the invention;

FIG. 59 is another exploded, perspective view of the conduit assembly in FIG. 58; and FIG. 60 is a perspective view of the conduit assembly in FIGS. 58 and 59, with the components in assembled relationship.

DETAILED DESCRIPTION OF THE PREFERRED EMBODIMENT

Figure 5:
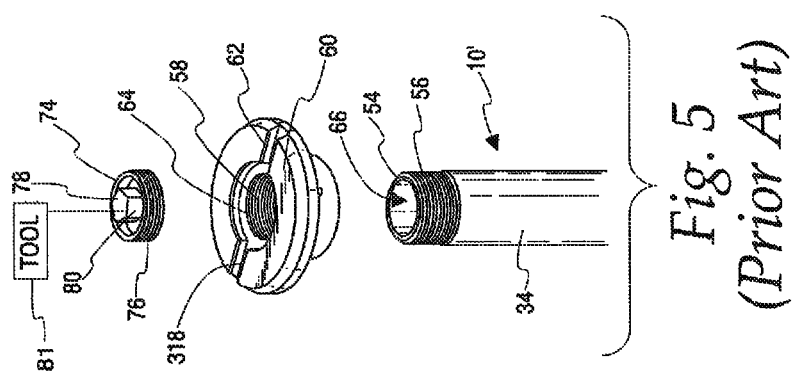
FIG. 5 is an enlarged, exploded, perspective view of a cap at an upper end of a conduit part on the conduit assembly in FIGS. 2-4.
Figure 4:
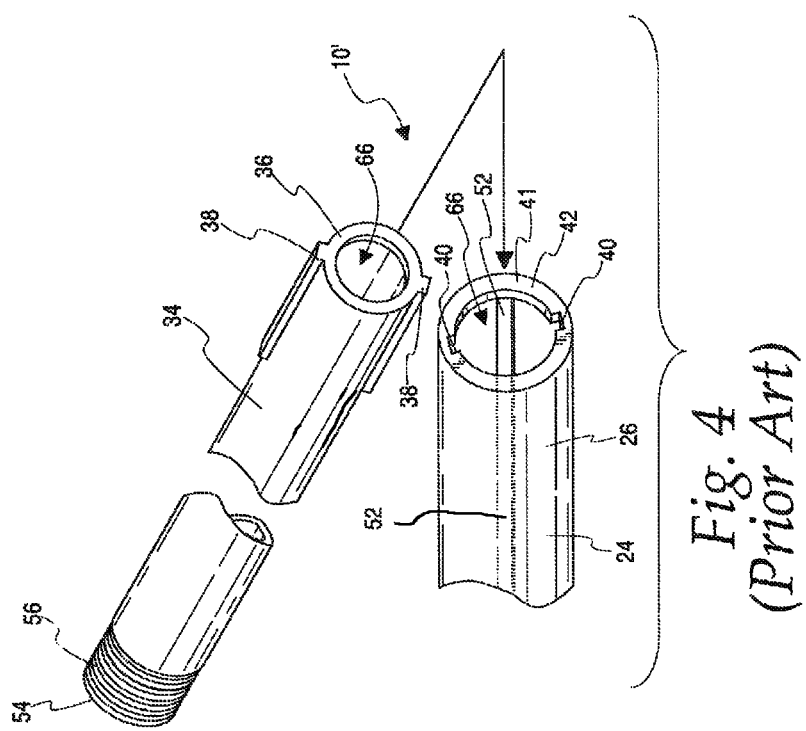
FIG. 4 is an enlarged, fragmentary, exploded, perspective view of cooperating conduit parts on the conduit assembly in FIGS. 2 and 3.

In FIG. 1, an exemplary form of the invention is shown in schematic form. A conduit assembly at 10 defines an access passage 12 through which above ground access can be gained to an actuator 14 on an underground valve 16. The valve 16 is associated with a supply line 18 for any flowable commodity, such as gas, water, etc. It is conceivable that the supply line 18 could even be capable of electrical conductivity whereby the actuator 14 acts as a switch. The supply line 18 may be any supply line, such as one that branches off as part of a network that supplies individual residences and/or businesses from a main supply. Through the actuator 14, the state of the valve 16 can be changed to control flow within the supply line 18. As examples, the actuator may be a simple on/off type arrangement or one that varies flow volume. As used herein, "valve actuator" is intended to encompass any underground component that has different states that might be accessed and changed through a conduit passage, regardless of the nature of the supply.

The conduit assembly 10 defines an entry opening 20 to the access passage 12. The conduit assembly 10 further has a cap 22 that can be selectively changed between: a) a first state wherein the cap 22 blocks the entry opening 20; and b) a second state wherein access can be gained to the valve actuator 14 through the entry opening 20 and access passage 12. The cap 20 may be fully separated in its second state, though this is not required.

The components shown in FIG. 1 are represented in schematic form to encompass specific forms, hereinbelow described, as well as variations thereof that would be apparent to one skilled in the art with the inventive teachings in hand. To understand the significance of the present invention, some further details of the prior art, as described generally above, will be explained herein, with the associated shortcomings.

Existing conduit assemblies are most commonly made with one of two different designs. A first prior art design is shown at 10' in FIGS. 2-5. The conduit assembly 10' consists of a lower conduit part 24 that is typically made from cast metal. The conduit part 24 has a stepped diameter with a smaller diameter portion 26 and a larger diameter portion 28. The larger diameter portion 28 has internal threads 30 that mate with cooperating threads 32 on a valve 16'.

A separate, upper conduit part 34 is telescopingly engaged with the conduit part 24. The lower end 36 of the conduit part 34 is formed to define diametrically oppositely projecting locking tabs 38, alignable one each with cutouts 40 in a flange 41 at the upper end 42 of the conduit part 24. With the locking tabs 38 and cutouts 40 angularly aligned, the conduit parts 24, 34 can be telescopingly engaged to be movable guidingly relative to each other along a lengthwise axis 44 of the conduit assembly 10'. A friction ring 46 is placed within a radially inwardly opening undercut 48 on the conduit part 24, acts against an outer surface 50 of the conduit part 34 to frictionally grip the conduit part 24, and functions to inhibit free sliding movement of the conduit part 34 relative to the conduit part 24.

The conduit part 24 has diametrically oppositely located ribs 52 each projecting radially inwardly at a location circumferentially midway between the cutouts 40 in a circumferential direction. The ribs 52 extend over potentially the full axial extent of the conduit part 24.

The upper end 54 of the conduit part 34 has external threads 56 thereon. The threads 56 cooperate with internal threads 58 on a cap 60 that is designed to be situated at approximately ground level GL. More specifically, the conduit parts 24, 34 are relatively repositioned so that the combined length L of the conduit parts 24, 34 and cap 60 situates the upper surface 62 of the cap 60 at approximately ground level GL. The conduit parts 24, 34 can be fixed with a selected combined length by turning the conduit part 34 relative to the conduit part 24 around the axis 44. As this occurs, the locking tabs 38 wedge forcibly against the ribs 52 so as to thereby maintain the conduit parts 24, 34 locked against relative axial and angular movement.

With this arrangement, the overall length L of the conduit assembly 10' in the vertical direction is substantially fixed. As a consequence, frost tends to expand compacted material M around the conduit assembly 10' so that it exerts a wedging force between the underside of the cap 60 and the supply line 18, or potentially between the underside of the cap 60 and other upwardly projecting surfaces, such as those produced by the different diameters of, and on, the conduit parts 24, 34. As mentioned in the Background portion herein, these forces could compromise the structure of the conduit assembly 10' and/or might inflict damage upon the valve 16' and/or supply line 18, necessitating underground access to the site at which the damage has occurred.

Typically, the conduit part 34 and cap 60 will both be made from metal. The threads 58 on the cap 60 bound an entry opening 64 and part of an axial access passage 66, extending between the entry opening 64 and the valve 16' and, more particularly, an actuator 70 therefor. A conventional tool 72 has an elongate construction and can be directed from above ground through the entry opening 64, into and through the passage 66, and into engagement with the actuator 70, which can be manipulated from above ground using the tool 72.

Access to the valve actuator 70 is controlled by a plug 74 that has external threads 76 to engage the internal threads 58 on the cap 60. A boss 78 with a pentagonal peripheral surface 80 is integrated into the plug 74 to accommodate a special tool 81 that is engaged with the boss 78 to controllably turn the plug 74 to tighten and release the same. The shape of the boss 78 makes it difficult to turn the plug 74 without having the special tool 81 that cooperates therewith, thereby limiting unauthorized access to the valve actuator 70.

Typically, the cap 60 will be made from metal that may be cast, or otherwise formed. The plug 74 is commonly made from a brass material. As noted in the Background portion herein, the cap 60 and plug 74 are both prone to corroding and/or accumulating moisture that may migrate between the threads 58, 76 thereon and freeze at low temperatures. These conditions each may cause the plug 74 to lock to the cap 60, whereupon torque applied to the boss 78 and the plug 74 may produce sufficient forces on other parts of the conduit assembly 10' and/or valve 16' to inflict damage thereupon.

Damage may also be inflicted by impact forces applied to the upper region of the conduit assembly 10' that is exposed above grade. For example, equipment employed to cut grass, plow snow, etc., may encounter the upper region of the conduit assembly 10' and damage the cap 60 and/or bend or fracture one of the conduit parts 24, 34. An exemplary fracture line that might be created under these circumstances is shown at FL in dotted lines in FIG. 2. Generally, the compacted material M will rigidify the conduit assembly 10' adequately that it is not prone to failing, when impacted, significantly below grade. This problem is aggravated when frost heaves the conduit assembly 10' to expose an additional length of the conduit assembly 10' above ground level GL. Since the upper region of the conduit assembly 10' is conventionally made with metal components, there is little flexibility to absorb impacts, which commonly leads to part failure/fracture.

The other most common configuration of prior art conduit assembly, mentioned above, is shown in FIG. 6 at 10". The conduit assembly 10" differs from the conduit assembly 10' primarily in the configuration of the conduit part 24", corresponding to the conduit part 24, and cooperating with the part 34", corresponding to the part 34. Whereas the conduit part 24 is directly connected to the valve 16', the conduit part 24" is integrated into a cast housing 82 that fits over a valve 16" in a relationship whereby it straddles the valve 16" and the supply line 18. To accomplish this, the cast housing 82 is made with an inverted cup shape with diametrically opposite cutouts 84 (one shown) to accommodate the supply line 18. With this configuration, the conduit assembly 10" does not fixedly connect to the valve 16". However, frost heaving may nonetheless damage the conduit assembly 10" and/or effect misalignment thereof with the valve 16" that may necessitate digging to access the site of failure, that may be a significant distance below ground, and potentially near or at valve level.

The conduit assembly 10" also includes the aforementioned cap 60 and plug 74. In the event that the cap 60 and plug 74 lock, torquing the plug 74 may inflict damage upon parts of the conduit assembly 10" therebelow, including potentially turning the cast housing 82 so that it is forced against the supply 18 and/or valve 16" upon which it might inflict damage.

Details of one exemplary form of the conduit assembly, according to the present invention, as shown schematically in FIG. 1, are shown in FIGS. 7-14.

One aspect of the present invention is the specific manner in which the cap 22 and another part 86 of the conduit assembly 10 interact, as shown schematically in FIG. 7. More specifically, a part 88 of the cap 22 interacts with the part 86 in a manner whereby the parts 86, 88 are relatively moved against each other as the cap 22 is changed between the aforementioned first and second states. According to the invention, at least one of the parts 86, 88 is made from a non-metal material. As explained below, in the specific embodiment, the exemplary parts 86, 88 are in the form of cooperating threads and both made from a non-metal material. However, this is not a requirement as another relatively movable parts arrangement might be utilized to selectively block and expose the entry opening 20 to the access passage 12.

In the specific exemplary form of the conduit assembly 10, the conduit assembly 10 is made up of three separate conduit parts—a first upper conduit part 90, a second conduit part 92, and a third conduit part 94. In its simplest form, the conduit part 90 can be utilized in conjunction with a single, separate, lower conduit part to define the access passage 12 between the entry opening 20 and the valve 16. However, in the depicted embodiment, the conduit part 90 is shown in association with the separate, existing, lower, conduit parts 92, 94, that correspond respectively to the conduit parts 34″, 24″ shown on the prior art conduit assembly 10″ in FIG. 6.

The first conduit part 90 and second conduit part 92 each has a vertical length along the central axis 96 of the conduit parts 90, 92, 94, and the access passage 12 is defined cooperatively thereby. The conduit parts 90, 92 are slidable guidingly in a lengthwise direction, one against the other, to change the effective combined length L1 of the conduit parts 90, 92. The conduit part 90 defines the part/threads 86 that cooperate with the part/threads 88 on the cap 22. For purposes of this disclosure, the cap 22 may be considered to be either separate from, or a part of, the conduit part 90.

While different cooperating mechanical components may be provided on the conduit parts 90, 92 to allow relative lengthwise movement therebetween, in the depicted form, the conduit part 92 fits within the conduit part 90 to produce a telescoping-type arrangement. The conduit part 92 has a generally cylindrical outer surface 97 centered on the lengthwise axis 96.

The first conduit part 90 has a through opening 98 within which the second conduit part 92 is directed. The opening 98 is bounded by a radially inwardly facing surface 100. A plurality, and in this case three, discrete, elongate, axially extending components/ribs 102 project radially inwardly from the radially inwardly facing surface 100 to engage the outer surface 97 of the second conduit part 92 and guide relative sliding movement between the first and second conduit parts 90, 92. The interaction of the ribs 102 and surface 100 causes the conduit parts 90, 92 to be frictionally held against relative angular and axial movement.

Additionally, an annular component/bead 104 projects radially inwardly from the surface 98 adjacent the lower region of the conduit part 90 to engage the outer surface 97 of the second conduit part 92 to establish a seal between the first and second conduit parts 90, 92 to block passage of debris therebetween. The bead 104 preferably extends fully and continuously around the axis 96 and also produces frictional holding forces between the conduit parts 90, 92.

In a preferred form, the first conduit part 90 is designed to translate in a vertical path relative to the conduit part 92, while being guided therealong. Once the material M is compacted around the full vertical extent of the conduit assembly 10, the conduit parts 90, 92 are held together additionally by forces from the compacted material M. Under normal conditions, the embedded conduit part 90 will be held with sufficient force by the compacted material M and the cooperating ribs 102 and surface 100 that it will not tend to shift vertically relative to the conduit part 92. However, under higher forces produced, as by expanded soil under frozen conditions, a threshold releasing force may be developed that causes vertical guided shifting of the conduit part 90 relative to the conduit part 92, thereby avoiding imparting of potentially damaging axial wedging forces upon other parts of the conduit assembly 10.

At the same time, the conduit part 90 is configured so that it will not turn within the compacted material M relative to the conduit part 92 as might allow separation of the conduit part 90 from the conduit part 92, which in turn might give unauthorized access to the valve 16 from above ground.

In the broadest sense, this resistance to turning may be produced by virtually any construction wherein the outer surface 106 of the conduit part 90 has a non-circular shape, as viewed in cross-section along the length of the axis 96. In the depicted embodiment, this non-circular outer peripheral surface 106 is produced by including at least one, and as shown at least two, discrete radial projections 108 at/from the surface 106. The projections 108 are shown in the form of elongate fins at diametrically opposite locations. Each fin 108 has circumferentially oppositely facing surfaces 110, 112 that inhibit turning of the first conduit part 90 within the surrounding compacted material M in which they are embedded.

The cap 22 is made integral with a boss 114 to be engaged by a special tool 116 that may be provided to only authorized personnel. The cap 22 may incorporate any type of turning system, of which there are currently many in this industry and in other industries, wherein the ability to turn a component is restricted to certain authorized personnel.

By turning the cap 22 in one direction around the axis 96, the cap 22 can be tightened through the cooperating threads 86, 88. Opposite turning allows the cap 22 to be separated from the main body 118 of the conduit part 90. In this embodiment, the body 118 has a radially enlarged upper region at 120 that is radially undercut at the top thereof where the threads 86 are formed. A part of the cap 22 nests in the undercut region with the cap 22 tightened. With the cap 22 tightened, an axially facing surface 122 thereon abuts to an axially oppositely facing surface 124 on the body 118 to effect a seal that is redundant to that provided by the cooperating threads 86, 88.

In the preferred form, the threads 86, 88 are both made from a non-metal material. However, advantages can be realized by making either one, and not the other, of the threads 86, 88 from a non-metal material. Preferably, the non-metal material produces an effective seal at the threads 86, 88.

In the most preferred form, the entire cap 22, and the entire body 118 are made from a non-metal material, such as molded urethane. However, the invention contemplates that only selected parts of the cap 22 and body 118 may be made from non-metal material, such as the preferred urethane composition.

By making the parts from urethane, they are not prone to rusting or corroding. Further, urethane provides the requisite structural strength and at the same time is sufficiently flexible that it will flex in response to, and absorb, many forces, imparted by torquing and impact that might cause a failure in metal parts.

To augment the thread holding forces, a plurality of cooperating, discrete components 126, 128 are provided respectively on the body 118 and cap 22. In this embodiment, each component 126 is in the form of an axial projection/nub on the surface 124, with the component 128 in the form of an accommodating, complementary receptacle on the surface 122. A series of these cooperating components 126, 128 are provided in circumferentially spaced locations around the axis 96.

These components 126, 128 serve multiple purposes. First of all, they give the user a feel that the cap 22 is fully tightened. Additionally, they perform a locking function, thereby augmenting the frictional holding force of the threads 86, 88. Thus, they tend to inhibit turning of the cap 22 relative to the body 118 so as to avoid unintended, and unauthorized, loosening of the cap 22.

By strategically using non-metal compositions for some, or all, of the main body 118, and the cap 22, unwanted locking of parts can be avoided. By making the ribs 102 from a non-metal material, they are not prone to locking to the outer surface 97 of the conduit part 92 that is typically made from metal.

In the depicted embodiment for the conduit assembly 10, the conduit parts 92, 94 are telescopingly engaged, one within the other, to change their effective combined length. They may be selectively fixed at a set length using the locking arrangement described for the conduit parts 24, 34 on the conduit assembly 10'. While the effective combined length of the second and third conduit parts 92, 94 becomes fixed, the effective combined length of the embedded conduit parts 90, 92 is allowed to change, as under heaving forces produced by frost in the compacted material M.

The conduit part 90 is capable of cooperating with the conduit parts 24, 34 on the conduit assembly 10' in the same manner as it cooperates with the corresponding components on the conduit assembly 10". No specific description will be made herein of the structure and interaction of the components for that variation.

With the inventive structure, a conduit assembly can be installed by a method, as shown in schematic form in FIG. 15, to facilitate controlled access to an actuator on an underground valve. According to the method, as shown at block 140, a conduit assembly is provided of the type described above. As shown at block 142, second and third conduit parts are placed in operative relationship with an underground valve. As shown at block 144, the combined effective length of the second and third components is set and fixed. A cap is operatively connected as shown at block 146. As shown at block 148, the first conduit part is moved relative to the second conduit part so that the cap is at the desired height, as with the top thereof at grade. As shown at block 150, material is compacted around the conduit assembly with the conduit assembly in its operative state, with the first and second conduit parts remaining slidable guidingly against each other to allow the effective combined length of the first and second conduit parts to change after the material is compacted around the conduit assembly. Of course, it is possible according to the invention to fix the relationship of the first and second conduit parts.

Another form of prior art conduit assembly is shown at 10''' in FIGS. 16-26. The conduit assembly 10''' is associated with a cast housing 82''', corresponding to that shown at 82 in FIG. 6. The housing 82''' straddles a valve 16''' associated with a supply 18.

The depicted conduit assembly 10''' and associated housing 82''' make up what is referred to in the industry as a "buffalo style" system. For purposes of understanding the present invention, the focus needs only to be upon the basic construction of the conduit assembly 10''', and not on how it specifically interacts with the valve 16'''. It suffices to say that the depicted version shows a straddling arrangement corresponding to that in FIG. 6.

As with the conduit assembly 10", the conduit assembly 10''' has upper and lower conduit parts 34''', 24''', respectively. The conduit parts 24''', 34''' define an access passage 12''' with an entry opening 20'''.

Typically, the upper conduit part 34''' is made from metal with an integral, enlarged flange 160 around the entry opening 20''' in which a receptacle 162 is defined for a cast iron cap 164. An undercut, annular seat 165 extends around the entry opening 20''' and defines a support for the cap 164.

An integrally formed tab 166 has an upwardly facing surface 168 that is generally co-planar with an upwardly facing surface 170 bounding the annular seat 162. With this arrangement, the underside 172 of the cap 164 can be facially placed against the surfaces 168, 170 so that the top side 174 of the cap 164 is substantially flush with the top of the flange 160.

The tab 166 has a receptacle 176 that is threaded to receive a threaded anchoring bolt 177 that is made from a brass material.

Figures 16, 17:
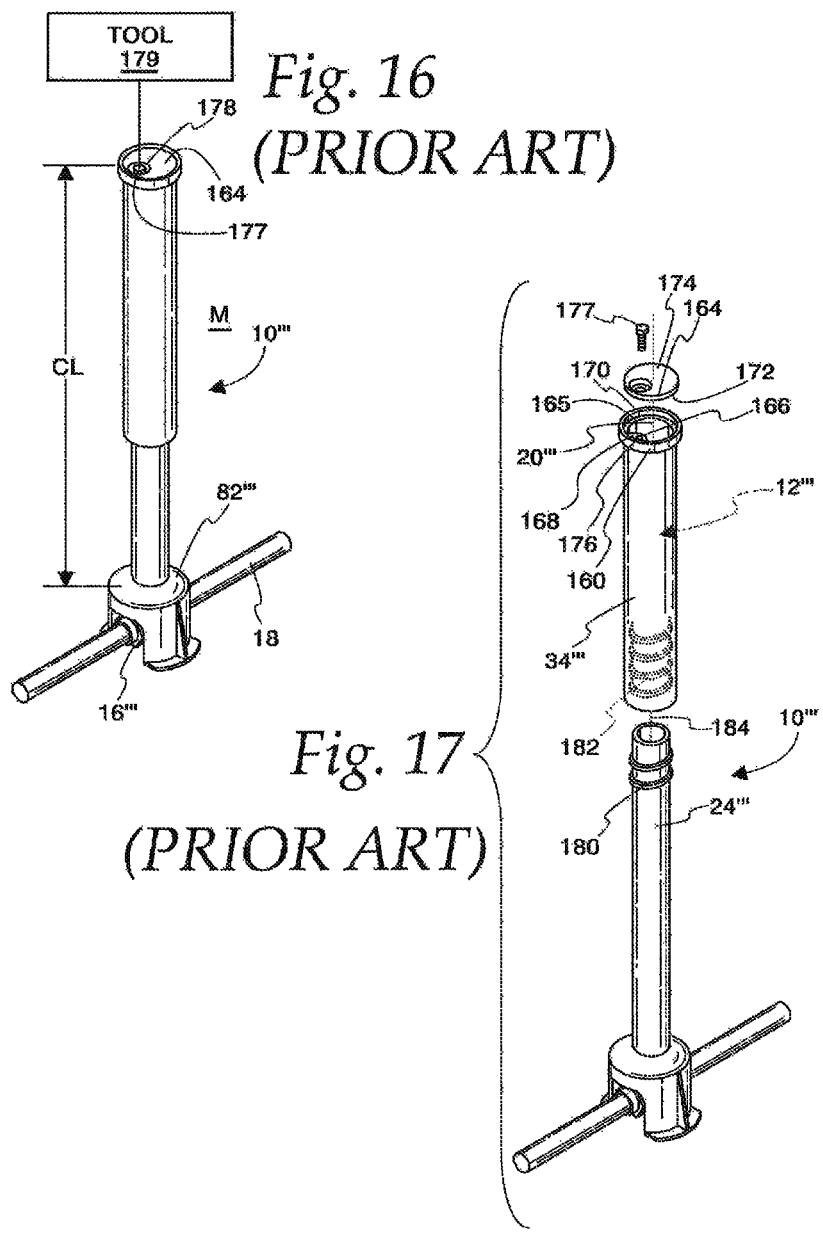
FIG. 16 is a view as in FIG. 6 of another form of prior art conduit assembly in an operative state relative to a valve on a supply line.
FIG. 17 is an exploded perspective view of the components shown in FIG. 16.

Typically, with the conduit assembly 10''' operatively positioned and embedded in ground material, as seen in FIG. 16, the cap 164 can be selectively changed between a first state, as shown in FIG. 16, wherein the cap 164 blocks the entry opening 20''', and a second state, as shown in FIG. 17, wherein above-ground access can be gained to the valve 16''' and its associated actuator.

The cap 164 is maintained in its first state by the bolt 177. The bolt 177 has a polygonally shaped head 178 to be engaged by a cooperating special access tool 179 to control access to the valve 16'''.

The conduit parts 24''', 34''' are telescopingly engaged to cause external threads 180 on the conduit part 24''' to engage internal threads 182 on the conduit part 34''' in a manner whereby turning of the upper conduit part 34''' relative to the lower conduit part 24''' around a vertical axis 184 changes the combined length CL of the conduit parts 24''', 34''' along the vertical axis 184. The length is increased or decreased, depending upon the direction of relative turning.

FIG. 18 shows the upper conduit part 34''' fully intact. In FIGS. 19-21, different types of damage are shown as typically inflicted upon the conduit part 34'''.

In FIG. 19, the tab 166 has been partially broken off, leaving a void at 186 in the tab 166 such that it is not usable to effect anchoring of the cap 164.

In FIG. 20, the entire tab 166 is shown broken off, together with a portion of the flange 160 and a portion of a peripheral wall 188 of the conduit part 34'''. As depicted, a substantial void 190 is created which is contiguous with a crack 192 in the wall 188.

In FIG. 21, an upper portion of the peripheral wall 188 is broken away such that the entire flange 160 and tab 166 have been removed.

Once one of the conditions shown in FIGS. 19-21 occurs, any security afforded by the cap 164 is compromised. One option when any of these conditions occurs is to remove enough of the ground material M to access substantially the full axial length of the conduit part 34''', to allow its separation from the conduit part 24'''. However, given the metal-to-metal threaded engagement between these parts, they are likely to be effectively fused and not practically separable in the field, particularly in below freezing conditions when water is frozen between these parts.

As a result, a secondary repair measure has been adopted utilizing a replacement cap 198, as shown in FIGS. 22-26. The replacement cap 198 consists of a disk-shaped cover 200 that can be placed against the annular seat 165 with the damaged state as shown in FIGS. 19 and 20, wherein at least part of the flange 160 and seat 165 remain intact.

The cap 198 has a pair of locking arms 202, 204 located at diametrically opposite locations at the underside of the cover 200. Each locking arm 202, 204 is connected to the cover 200 in like fashion. Exemplary locking arm 202 is mounted by a pin 206 for pivoting movement about a horizontal axis 208. The pin 206 extends through a pair of depending, flat tabs 210, 212, integral with the cover 200, and also through the locking arm 202 therebetween. The locking arm 202 has a radially inwardly facing cam edge 214.

The locking bolt 216 is threadably engaged with a cam block 218 with an angled cam surface 220 that cooperates with the cam edge 214. Turning of the locking bolt 216 in one direction causes the block 218 to move vertically upwardly relative to the cover 200, thereby camming each of the locking arms 202, 204 radially outwardly to cause edges 222, 224, respectively thereon, to bear against a radially inwardly facing surface 226 bounding the access passage 12'''. The locking bolt 216 has the aforementioned polygonally shaped head 228, included for purposes of limiting access.

Figure 26:
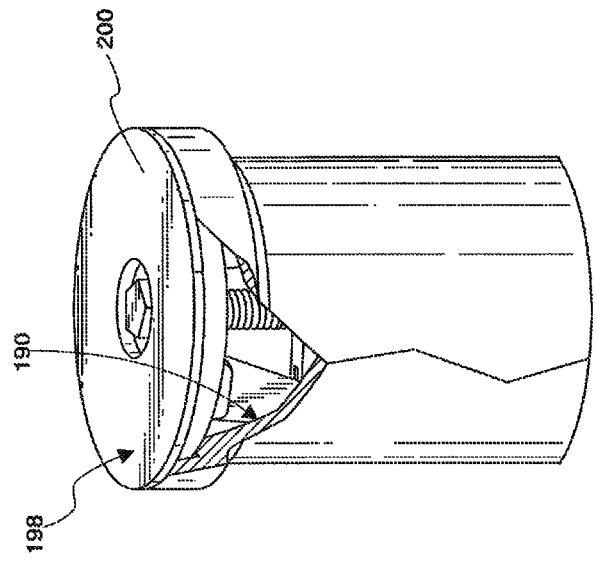
FIG. 26 is a view as in FIG. 25 with the conduit part having the FIG. 20 condition.
Figure 25:
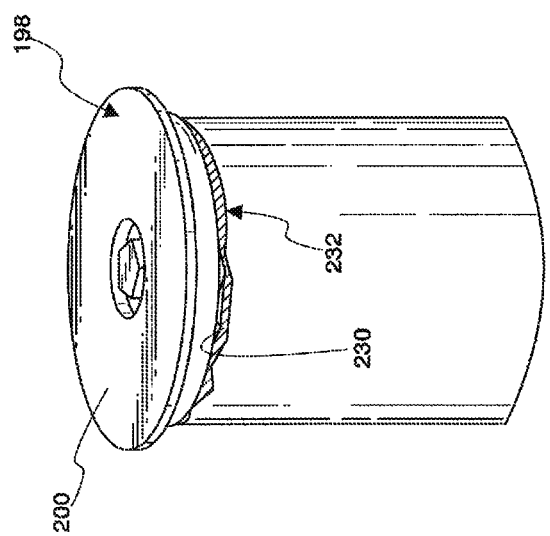
FIG. 25 is a perspective view of the replacement cap in FIG. 22 operatively connected with the conduit part in the condition shown in FIG. 21.
Figure 38:
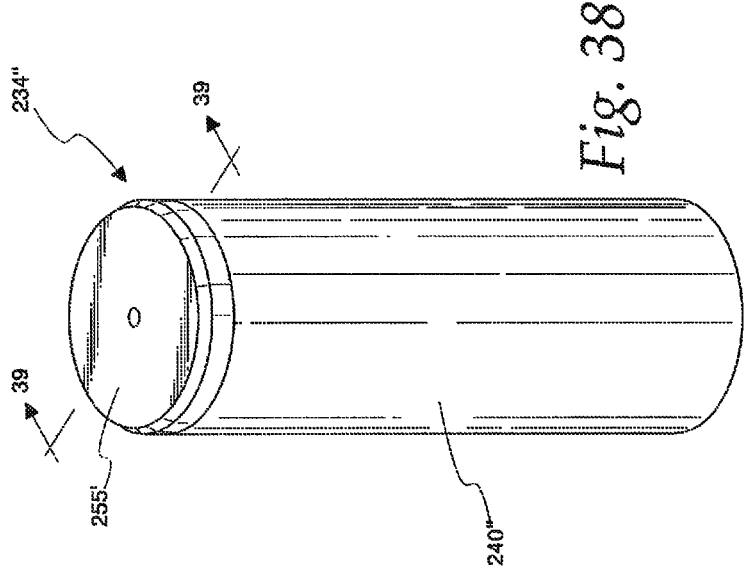
FIG. 38 is a perspective view of a further modified form of repair assembly according to the invention.
Figure 39:
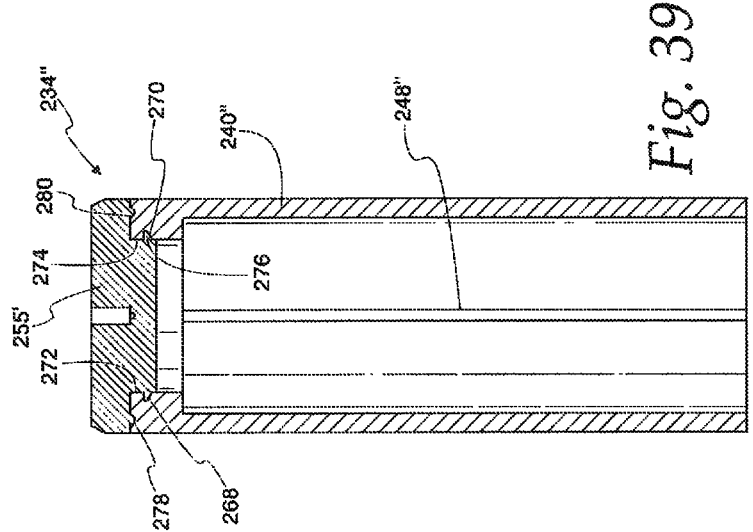
FIG. 39 is a cross-sectional view of the repair assembly taken along line 39-39 of FIG. 38.

The replacement cap 198 is generally effective for dealing with the repair condition shown in FIG. 19. The replacement cap 198, as used on the conduit part 34''' with the condition shown in FIG. 20, leaves a significant part of the aforementioned void 190 exposed, as seen in FIG. 26. Consequently, moisture and solid foreign matter may migrate through the void 190 into the access passage 12''' to eventually build up to the point that it may be difficult or impossible to control the valve 16''' from above ground.

The replacement cap 198 is likewise less than fully effective when used on the conduit part 34''' with the condition as shown in FIG. 21. As shown also in FIGS. 21 and 25, a jagged upper edge 230 causes a void/gap 232 to be maintained that again permits the ingress of foreign matter that may be solid or liquid in form.

According to the present invention, and as shown in FIGS. 27-34, the conduit part 34''' on the conduit assembly 10''' is modified and used in conjunction with a repair assembly 234 to effect field repair.

In the event that there is a flange 160 on the existing conduit part 34''' remaining partially or fully intact, as shown in FIG. 27, a portion of the length of the conduit part 34''' at its upper end is removed to eliminate that portion of the conduit part 34''' having a diameter larger than the main portion 235 of the wall 188. Typically the removal will be effected by a cutting step. This exposes an upper edge 236 defined by a remaining portion 238 of the conduit assembly 10'''. As explained below, the edge 236 does not have to be cleanly cut, nor does the entire defect have to be removed as part of the removed length, as seen in FIG. 28.

The repair assembly 234 consists of a conduit piece 240 that defines an upper entry opening 242 and slides over the top region of the conduit part 34'''. The conduit piece 240, once engaged with the conduit part 34''', is moved axially guidingly against the conduit part 34''', making up part of the remaining portion 238 of the conduit assembly 10''', to thereby situate the entry opening 242 at a desired axial location, preferably at or adjacent to ground level.

An inside, radially inwardly facing surface 244 bounding that portion of the access passage 12''' defined by the conduit piece 240 may be closely conformed to the radially outwardly facing surface 246 on the conduit part 34'''. Alternatively, an arrangement as shown in FIGS. 11 and 12 might be utilized. As seen in FIG. 33, radially inwardly projecting components 248, spaced circumferentially around the inside surface 244, may cooperatively engage the radially outwardly facing surface 246 to cause the radially projecting components 248 and radially inwardly facing surface 244 to engage so as to frictionally resist relative axial movement between the conduit piece 240 and conduit part 34'''. While three such components 248 are shown in FIG. 33, a single component 248 might be utilized, or a number in excess of three might be utilized. This interaction promotes guiding of the telescopingly engaged conduit piece 240 and conduit part 34'''. It should be noted that the components 248 might be provided on the conduit part 34''' to engage the surface 242 to function in the same manner.

An upper flange 250, within which the entry opening 242 is formed, has threads 252 thereon formed around the entry opening 242 to cooperate with threads 254 on a cap 255 that is utilized to selectively block and expose the entry opening 242.

In a preferred form, both the cap 255 and the conduit piece 240 are made from a non-metal material. One preferred composition is urethane.

In this embodiment, the conduit piece 240 has a plurality of projecting components 256 spaced circumferentially equidistantly around the flange 250. While six such components 256 are shown, this number is not critical—one or more than six might be utilized. The cap 255 has a corresponding number of receptacles 258 at an axially facing underside surface 260 that faces axially oppositely to the flange surface 261 upon which the components 256 are located. As the cap 255 is tightened, the projecting components 256 are pressed one each into the receptacles 258 so as to resist turning of the cap 255.

A polygonally-shaped turning head 262 is integrally formed with the cap 255 to facilitate turning by a matched tool. Again, this construction is designed for security purposes.

The cap 255 has a different construction than the cap 164, and by reason of the molded construction described, makes possible a positive seal between the cap 255 and conduit piece 240 at the entry opening 242.

With the above-described construction, ground material M can be removed from around the damaged conduit assembly 10''' adequately to expose enough of the conduit part 34''' to allow removal of the damaged flange region. The conduit piece 240 can then be slid in place and translated axially downwardly to a desired height. By firmly compacting ground material M around the conduit piece 240 after it is assembled, substantial resistance to turning of the conduit piece 240 relative to the conduit part 34''' is created.

As an alternative to using a conduit piece that surrounds the upper region of the conduit part 34''', as seen in FIGS. 35-37, a modified form of conduit piece 240' can be used with radially outwardly projecting components 256' that cooperatively engage the radially inwardly facing surface 264 (FIG. 29) on the conduit part 34'''. The conduit piece 240' and cap 255 cooperatively make up a modified form of repair assembly 234'. The cap 255 cooperates with the conduit piece 240' in the same manner that the cap 255 cooperates with the conduit piece 240.

With the repair assembly 234', the conduit piece 240' is simply translated into the conduit part 34''' under pressure until a downwardly facing annular edge 266 thereon abuts to the edge 236 (FIG. 28) formed by cutting away at least the damaged flange 160.

A cylindrical body 267 on the conduit piece 240' can be cut to an appropriate length in the field so that the cap 255 resides at a desired height. The body 267 and cap 255 are both preferably made from a non-metal/urethane material that lends itself to convenient field cutting.

A further modified form of repair assembly is shown at 234'' in FIGS. 38-42. The repair assembly 234'' utilizes a conduit piece 240'' that is configured generally as the conduit piece 240, to surround the upper region of the conduit part 34'''. Friction/guide components 248'' are utilized for the same purpose as the aforementioned, corresponding components 248, 248'.

There are two primary distinctions between the repair assemblies 234 and 234''. First of all, a cap 255' is snap connected to the conduit piece 240'' as opposed to being threaded thereto. To accomplish this, an annular bead 268 is provided around the cap 255' with an angled edge 270. As the cap 255' is pressed downwardly, the bead 258 is deformed as the edge bears against a surface 272 surrounding an entry opening 274. With the cap 255' fully seated, the deformed bead 258 aligns with a complementarily-shaped receptacle 276 into which the bead 268 springs. The bead 258 blocks axial movement of the cap 255' and thereby releasably maintains the connection between the cap 255' and conduit piece 240". The cap may be pried off when access to an associated underground valve is needed.

The second difference resides in the provision of an annular sealing component 278 on the cap 255' that fits in a complementary receptacle 280 with the cap 255' fully seated. With the cap 255' placed operatively upon the conduit piece 240", the sealing component 278 is pressed into the receptacle 280.

It is contemplated that this sealing arrangement might be utilized in any of the other embodiments, such as on the repair assembly 234'.

Preferably, the conduit piece 240''' and cap 255' are made from a non-metal/urethane material.

Referring to FIGS. 5 and 43-46, another commonly recurring field condition is depicted, together with conventional structure utilized to effect on-site repairs. Frost heaving and/or impact may cause the threads 56 on the conduit part 34 to break off in or below the cap 60, as shown in FIG. 43.

A repair cap assembly 300 has a cylindrical sleeve 302 with a cap 304 formed integrally therewith. The repair cap assembly 300 is typically made from cast metal. The upper region of the repair cap assembly 300 has the same general configuration as the cap 60, including internal threads 305 to mate with the external threads 76 on the plug 74.

The sleeve 302 has an inside surface 306 that can be slid guidingly downwardly against the outside surface of the conduit part 34 until an upper edge 308, defined by the fractured conduit part 34, abuts an edge 310 defined by a step between the inside surface 306 and a smaller diameter region at which the threads 305 are formed.

Set screws 312 are directed one each through vertically spaced, radial bores 314 which are threaded to engage external threads 316 on the set screws 312. By tightening the set screws 312, the repair cap assembly 300 can be fixed at a desired vertical height relative to the conduit part 34.

Replacement of metal parts with metal parts, in the system shown in FIGS. 44-46, reintroduces the aforementioned problems, among which are the potential fusion between the plug 74 and repair cap assembly 300.

With the conventional cap 60, shown in FIG. 5, and the repair cap assembly 300, a full diameter slot 318, 319 is formed to accommodate a turning tool. In each of the inventive embodiments in which a non-metal component is turned to access the passage 12, alternative turning arrangements are contemplated. While the use of a slot 320 (FIG. 8), corresponding to that shown at 318 and 319, is contemplated, more preferably, the turning may be effected by using, in each inventive embodiment, a polygonally-shaped turning head, as shown at 262 in FIG. 31, and/or spaced openings 323, 324, which cooperate with an actuating tool, as shown at AT in FIGS. 47-50. The tool AT is a multi-purpose tool with a conventional construction.

More particularly, the tool AT has an elongate handle 325 which connects to an operating head 326. The operating head 326 is elongate and forms a "T" shape with the length of the handle 325. The operating head 326 has at one of its lengthwise ends a fitting 328 with a polygonal receptacle 330 to make keyed connection to the turning head 262.

At the opposite lengthwise end of the operating head 326, a "Y"-shaped fitting at 332 is formed with spaced prongs 334, 336 that can be placed, one each, in one of the openings 323, 324. With the prongs 334, 336 seated in the openings 323, 324, the elongate handle 325 can be manipulated to produce the desired directional torque upon the cap 255. Alternatively, the fitting 326 can be engaged and used to turn the head 262 in the same manner.

At the end of the elongate handle 325, remote from the operating head 326, a separate fitting 338 is provided to engage the actuator 14 on the valve 16 to effect turning thereof. The T-shaped arrangement of the actuating tool allows the operating head 326 to be grasped and manipulated to turn the elongate handle 325 about its lengthwise axis to operate the valve 16.

The cap depicted in FIG. 31 is exemplary only of the other caps shown herein, and others that could be devised by one skilled in the art with the present invention in hand, that could be operated through a like tool AT.

With the prior art conduit assembly 10', as shown in FIGS. 2 and 3, it may be desirable to directly access the valve 16' by separating the threadably engaged conduit part 24 therefrom. The metal threads 30, 32 may become effectively fused as they corrode and rust over time in the presence of underground moisture. Attempted separation of the conduit part 24 may thus result in the destruction of the conduit part 24, the valve 16', and/or the supply line 18. These problems are addressed by a further modified form of inventive conduit assembly, shown at $10^{4'}$ in FIGS. 51-56.

The conduit assembly $10^{4'}$ functions in substantially the same manner as the other versions of the inventive conduit assembly, described above, to allow above-ground access to the actuator 70 on the valve 16' through which the state of the valve 16' can be changed to control flow within the supply line 18.

The conduit assembly $10^{4'}$ is embedded in ground material and defines an access passage $66^{4'}$ through which above-ground access can be obtained to the valve actuator 70.

The conduit assembly $10^{4'}$ has an adaptor assembly at 402 with a body 404 made from a non-metal material. In a preferred form, the body 404 is made from a urethane material, as by a molding process. Urethane is desired for its ability to flex and thereby absorb torsional and other imparted forces, such as impact forces, etc. This avoids direct transmission of potentially damaging forces to the valve 16'.

The adaptor assembly 402 has a generally cylindrical shape with a central axis 406. The adaptor assembly 402 has separate connectors 408, 410 at axially spaced locations.

The valve 16' has a connector in the form of external threads 412 that cooperate with internal threads 416 that make up the connector 410. Through this arrangement, the body 404 can be strategically placed relative to the valve 16' and turned around the axis 406, manually or through a powered actuator, to operatively connect the body 404 on the adaptor assembly 402 to the valve 16'. With the body 404 operatively connected to the valve 16', the body 404 bounds a portion of the access passage $66^{4'}$.

Figure 56:
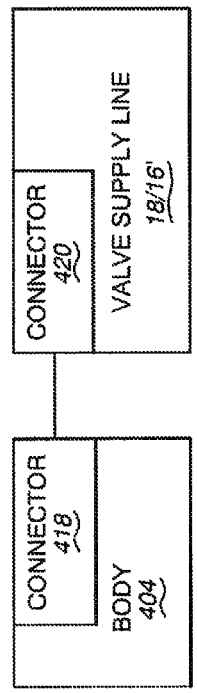
FIG. 56 is a schematic representative of a connection between a body on the adaptor assembly in FIGS. 53-55 and an underground valve and/or supply line.

While a threaded connection as shown in FIG. 56 is preferred, the invention contemplates that virtually any type of known connector arrangement can be used to connect the body 404 to the valve 16' and/or supply line 18 so that access can be gained therethrough to the actuator 70 for the valve 16'. The cooperating connectors on the body 404 and valve 16'/supply line 18 are respectively shown in schematic form in FIG. 56 at 418 and 420, respectively, to encompass the many variations contemplated.

With the body 404 operatively connected to the valve 16', the conduit part $24^{4'}$ can be operatively connected thereto. Of course, the conduit part $24^{4'}$ can be connected to the body 404 before the body 404 is connected to the valve 16'. The conduit part $24^{4'}$ has a length between spaced ends 422, 424. While the conduit part $24^{4'}$ might be used alone to extend to above ground, in the preferred form depicted, a further conduit part $90^{4'}$ is additionally utilized. The conduit part $90^{4'}$ corresponds to the conduit part 90, described above. While the conduit part $90^{4'}$ may have a different construction, for purposes of simplicity, it will be considered to have the same construction as the conduit part 90, including a repositionable cap $22^{4'}$ at an entry opening $20^{4'}$.

The adaptor assembly 402, conduit part $24^{4'}$, and conduit part $90^{4'}$ may be interconnected through virtually a limitless number of different types of cooperating structures, including those using separate fasteners, adhesive, cooperating threads, etc. The preferred structure for effecting this interconnection is described herein but should not be viewed as limiting.

In the depicted embodiment, the adaptor assembly 402 has a cylindrical receptacle 426 bounded by an annular surface 428 that defines the connector 408. The end 422 of the conduit part $24^{4'}$ has an external diameter selected so that the end 422 can be slid guidingly into the receptacle 426. This telescoping arrangement allows a simple translation of the conduit part $24^{4'}$ relative to the adaptor assembly 402 to effect connection, which is desirable given the limited access space for workers installing the conduit assembly $10^{4'}$. The connection between the conduit part end 422 and adaptor assembly 402 may be maintained as by an adhesive, or the like. Of course, the male/female relationship of these parts can be reversed.

The end 424 of the conduit part $24^{4'}$ telescopingly engages the conduit part $90^{4'}$ in the same manner that the conduit part 92 engages the conduit part 90 in the embodiments described above.

In one preferred form, substantially the entire conduit assembly $10^{4'}$ extending away from the valve 16' is made from non-metal materials. The conduit part $90^{4'}$, together with the cap $22^{4'}$, is preferably made from a urethane material, or others as described above for the corresponding parts 90, 22.

The conduit part $24^{4'}$ can be made from PVC pipe, ABS pipe, or the like. A metal construction of some or all of the components extending away from the adaptor assembly 402 is also contemplated.

In the depicted form, the connector 410 is defined by a separate component 430 around which a main body part 432, made preferably from urethane, is molded to conform thereto. The component 430 may be made from any metal or non-metal material typically used in this type of application. A plurality of circumferentially spaced, elongate ribs 434 project outwardly from a cylindrical body 436 on the component 430 to key the component 430 against turning around the axis 406 relative to the main body part 432 with the main body part 432 molded therearound.

The connector 408, as depicted, is defined by a separate component 438 that is embedded with the main body part 432 molded therearound. The component 438 is preferably made from a material such as PVC. However, other non-metal materials, as well as metal materials, are contemplated. The component 438 has a radially projecting rim 440 with a non-round/polygonal shape that maintains a positive connection between the component 438 and the main body part 432 molded therearound. Alternatively, the rim 440 may reside at the top of a body part 432 to facilitate consistent axial placement of the component 438 on the body part 432.

The component 438 defines a stop surface/edge 441 that arrests downward axial movement of the conduit part $24^{4'}$. This avoids inadvertent contact between the conduit part $24^{4'}$ and valve 16' during assembly of the conduit assembly $10^{4'}$, thereby minimizing the likelihood of damage to the valve 16' during installation of the conduit assembly $10^{4'}$.

The connectors 408, 410 could alternatively be formed integrally, as one piece, with the main body part 432.

The main body part 432 has an overall cylindrical shape with an outer surface 442 and at least one, and as depicted a plurality, of components 444 projecting radially outwardly therefrom. As depicted, the components 444 are provided in the form of axially extending, elongate ribs that are spaced circumferentially around the outer surface 442. The components 444 facilitate hand gripping of the body 404 to effect turning to both secure and release the same. At the same time, with ground material compacted around the body 404 with a completed construction, the components 444 tend to resist turning of the body such as might lead to an inadvertent loosening of the adaptor assembly 402 from the valve 16'.

As with the conduit part 90, the conduit part $90^{4'}$ has a construction for the cap $22^{4'}$ that allows the cap $22^{4'}$ to be selectively changed between: a) a first state wherein the cap $22^{4'}$ blocks the entry opening $20^{4'}$; and b) a second state wherein above ground access can be gained to the valve actuator 70 through the entry opening $20^{4'}$ and access passage $66^{4'}$.

Figure 57:
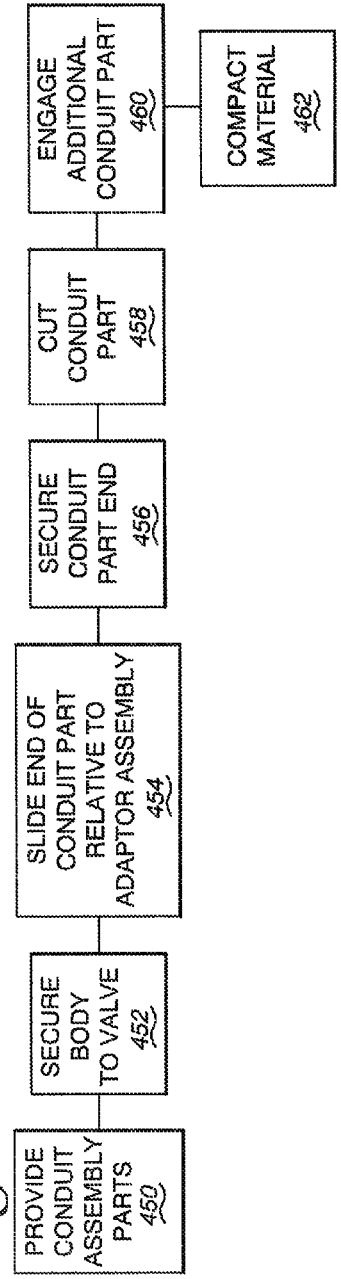
FIG. 57 is a flow diagram representation of a method of installing a conduit assembly, according to the invention, to facilitate controlled access to an actuator on an underground valve.

With the above structure, a method of installing a conduit assembly to facilitate controlled access to an actuator on an underground valve can be carried out, according to the invention, as shown in flow diagram form in FIG. 57.

As shown at block 450, the conduit assembly parts, described above, are provided.

As shown at block 452, the body of the adaptor assembly is secured to the underground valve.

As shown at block 454, an end of the first conduit part is slid relative to the adaptor assembly into a first relationship and secured as shown at block 456.

As shown at block 458, the conduit part secured to the adaptor assembly is cut to a selected length. This cutting may occur ahead of time or may take place at the site at which the underground valve is located. In either case, the conduit part may be used to define the entry opening or may be joined to another conduit part.

With this arrangement, crews can be provided with conduit parts that are long enough to project above ground at virtually every anticipated site configuration. Workers on site can then cut the conduit part flush to ground level or to cooperate with a separate conduit part.

With an additional conduit part utilized, as shown at block 460, the additional conduit part can be engaged, preferably using a telescoping arrangement between the cooperating conduit parts.

As shown at block 462, ground material can be compacted around the conduit assembly.

A further modified form of conduit assembly is shown at $10^{5'}$ in FIGS. 58-60. The conduit assembly $10^{5'}$ incorporates the conduit part $90^{4'}$ and adaptor assembly 402, both as described above. The adaptor assembly 402 cooperates with the valve 16', as also described above.

One difference between the conduit assembly $10^{5'}$ and the conduit assembly $10^{4'}$ is that the conduit part $24^{4'}$ is substituted for by separate conduit pieces 500, 502 joined to each other by a conventional type coupler 504.

The upper region 506 of the conduit piece 500 cooperates with the conduit part $90^{4'}$ in the same manner that the conduit part $24^{4'}$ cooperates therewith. Similarly, the lower region 508 of the conduit piece 502 cooperates with the adaptor assembly 402 in the same manner that the conduit part 24<sup>4'</sup> cooperates therewith on the conduit assembly 10<sup>4'</sup>.

This multi-piece design facilitates on-site construction of the conduit assembly 10<sup>5'</sup> and further facilitates the incorporation of an extension rod 510 that is connected to the valve actuator 70 in a manner such that they turn together around the vertical conduit assembly axis 512. The extension rod 510 makes possible the use of a relatively short tool 72<sup>5'</sup> and facilitates convenient operative engagement of the tool 72<sup>5'</sup> with a fitting 514 at the upper extremity of the extension rod 510.

With all embodiments, the incorporation of non-metal components minimizes the likelihood of extensive damage to the conduit assemblies resulting from impacts and other forces imparted at the exposed, upper regions of the conduit assemblies. These forces may be imparted by lawn mowing equipment, plows, etc. Urethane components will tend to absorb these otherwise potentially damaging forces and may flex or fail without transmitting damaging forces to other parts of the conduit assemblies, and particularly those made from metal. Metal parts, and primarily those reinforced below grade, are thus less likely to be damaged.

The foregoing disclosure of specific embodiments is intended to be illustrative of the broad concepts comprehended by the invention.

The invention claimed is:

1. In combination: an underground valve for a supply line and having an underground actuator through which a state of the valve can be changed to control flow within the supply line; and a conduit assembly embedded in ground material and defining an access passage through which above ground access can be obtained to the valve actuator, the conduit assembly comprising an adaptor assembly, the adaptor assembly comprising a body having at least a first connector, the valve having at least a second associated connector, the first and second connectors configured to cooperate to maintain the body operatively connected to the valve, the conduit assembly further comprising at least a first conduit part configured to connect to the body and bound a portion of the access passage accessible through an entry opening remote from the valve, wherein the first and second connectors comprise cooperating threads, wherein the adaptor assembly comprises a main body part and a separate component that is connected to the main body part and defines the threads making up the first connector, wherein the conduit assembly has a central axis and the main body part and the component are separately formed so that the main body part conforms around the component such that the main body part and the component are keyed against relative turning around the central axis.

2. The combination according to claim 1 wherein the body has a cylindrical shape with a central axis and a cylindrical outer surface from which at least one component projects radially relative to the central axis and is configured to facilitate hand gripping of the body by allowing a user's hand to wrap against the cylindrical outer surface and the at least one component.

3. The combination according to claim 2 wherein the at least one component comprises a plurality of circumferentially spaced, axially extending ribs.

4. The combination according to claim 1 wherein the first conduit part is made from a non-metal material.

5. The combination according to claim 4 wherein the conduit assembly further comprises a second conduit part, the first conduit part having a first end connected to the body and a second end, the second conduit part having first and second ends, the first end of the second conduit part and second end of the first conduit part configured to be telescopingly engaged to thereby allow changing of a combined length of the first and second conduit parts.

6. The combination according to claim 5 wherein the second conduit part extends to an entry opening to the access passage and is made from a non-metal material.

7. The combination according to claim 6 wherein the conduit assembly further comprises a cap that can be selectively changed between: a) a first state wherein the cap blocks the entry opening; and b) a second state wherein above ground access can be gained to the valve actuator through the entry opening and access passage.

8. The combination according to claim 7 wherein substantially the entire conduit assembly extending away from the body toward the entry opening is made from a non-metal material.

9. The combination according to claim 1 wherein the body is made from urethane.

10. The combination according to claim 1 wherein the component is made from a non-metal material.

11. A method of installing a conduit assembly to facilitate controlled access to an actuator on an underground valve, the method comprising the steps of:
providing the combination of claim 5 wherein the conduit assembly has a central axis;
securing the body to the valve;
sliding an end of the first conduit part relative to the adaptor assembly parallel to the central axis and into a first relationship with the adaptor assembly;
securing the end of the first conduit part relative to the adaptor assembly with the end of the first conduit part and adaptor assembly in the first relationship;
cutting the first conduit part at a second location so that the first conduit part has a selected length between the end of the first conduit part and a second location;
telescopingly engaging the second conduit part with the first conduit part so that the first and second conduit parts have a desired combined length; and
compacting material around the conduit assembly.

12. The method according to claim 11, wherein the step of securing the body to the valve comprises securing the body to the valve through a threaded connection by turning the body around an axis relative to the valve.

13. The method according to claim 11 wherein the step of cutting the first conduit part comprises cutting the first conduit part at a site at which the underground valve is located.

14. In combination: an underground valve for a supply line and having an underground actuator through which a state of the valve can be changed to control flow within the supply line; and a conduit assembly embedded in ground material and defining an access passage through which above ground access can be obtained to the valve actuator, the conduit assembly comprising an adaptor assembly, the adaptor assembly comprising a body made from a urethane material and having at least a first connector, the valve having at least a second associated connector, the first and second connectors comprising cooperating threads configured to cooperate to maintain the body operatively connected to the valve, the adaptor assembly further comprising a main body part and a separate component that is connected to the main body part and defines the threads making up the first connector, wherein the conduit assembly has a central axis and the main body part and the component are separately formed so that the main body part conforms around the component such that the main body part and the component are keyed against relative turning around the central axis, wherein the conduit assembly further comprises at least a first conduit part configured to connect to the body and bound a portion of the access passage accessible through an entry opening remote from the valve, wherein the body has a cylindrical shape with a central axis and a cylindrical outer surface from which at least one component projects radially relative to the central axis and is configured to at least one of: a) facilitate hand gripping of the body; and b) resist turning of the body around the central axis with ground material compacted around the body.

15. The combination according to claim 14 wherein the adaptor assembly and a first end of the first conduit part are configured so that the first end of the first conduit part and adaptor assembly are telescopingly engaged to be movable guidingly, one against the other, in a straight line.

16. The combination according to claim 15 wherein the adaptor assembly comprises the main body part and a second separate component that is connected to the main body part and configured to telescopingly engage the first end of the first conduit part.

17. The combination according to claim 15 wherein the first end of the first conduit part is secured to the adaptor assembly with an adhesive.

18. The combination according to claim 14 wherein the component is made from a non-metal material.

19. In combination: an underground valve for a supply line and having an underground actuator through which a state of the valve can be changed to control flow within the supply line; and a conduit assembly embedded in ground material and defining an access passage through which above ground access can be obtained to the valve actuator, the conduit assembly comprising an adaptor assembly, the adaptor assembly comprising a body made from a urethane material and having at least a first connector, the valve having at least a second associated connector, the first and second connectors comprising cooperating threads configured to cooperate to maintain the body operatively connected to the valve, the adaptor assembly further comprising a main body part and a separate component that is connected to the main body part and defines the threads making up the first connector, wherein the conduit assembly has a central axis and the main body part and the component are separately formed so that the main body part conforms around the component such that the main body part and the component are keyed against relative turning around the central axis, wherein the conduit assembly further comprises at least a first conduit part configured to connect to the body and bound a portion of the access passage accessible through an entry opening remote from the valve.

* * * * *